US011144549B2

(12) United States Patent
Portisch et al.

(10) Patent No.: US 11,144,549 B2
(45) Date of Patent: *Oct. 12, 2021

(54) DYNAMIC GENERATION OF JOIN STATEMENTS FOR DATABASE OPERATIONS

(71) Applicant: SAP SE, Walldorf (DE)

(72) Inventors: Jan Portisch, Bruchsal (DE); Sandra Bracholdt, Dielheim (DE); Volker Saggau, Bensheim (DE)

(73) Assignee: SAP SE, Walldorf (DE)

( * ) Notice: Subject to any disclaimer, the term of this patent is extended or adjusted under 35 U.S.C. 154(b) by 174 days.

This patent is subject to a terminal disclaimer.

(21) Appl. No.: 16/221,151

(22) Filed: Dec. 14, 2018

(65) Prior Publication Data

US 2020/0192901 A1 Jun. 18, 2020

(51) Int. Cl.
*G06F 16/00* (2019.01)
*G06F 16/2453* (2019.01)
*G06F 16/28* (2019.01)
*G06F 16/901* (2019.01)

(52) U.S. Cl.
CPC .. *G06F 16/24544* (2019.01); *G06F 16/24535* (2019.01); *G06F 16/289* (2019.01); *G06F 16/9024* (2019.01)

(58) Field of Classification Search
CPC .. G06F 16/2455; G06F 3/0482; G06F 16/248; G06F 3/04842; G06F 16/972; G06F 16/2456; G06F 16/2282; G06F 16/2428; G06F 16/24535; G06F 16/24544; G06F 16/26; G06F 16/9024; G06F 16/955; G06F 16/00; H04L 67/24
See application file for complete search history.

(56) References Cited

U.S. PATENT DOCUMENTS

| | | | |
|---|---|---|---|
| 5,546,570 A | 8/1996 | McPherson, Jr. et al. | |
| 6,609,123 B1 * | 8/2003 | Cazemier | G06F 16/289 |
| 7,111,020 B1 * | 9/2006 | Gupta | G06F 16/24539 |
| 7,158,994 B1 * | 1/2007 | Smith | G06F 16/24539 |
| | | | 707/717 |

(Continued)

OTHER PUBLICATIONS

"Creating Alternate Keys," SAP Help Portal, May 17, 2018, 1 page.

(Continued)

*Primary Examiner* — Jean M Corrielus
(74) *Attorney, Agent, or Firm* — Klarquist Sparkman, LLP

(57) ABSTRACT

A process for mining existing views to generate join statements is provided herein. A request to generate a join statement may be received, which may include a database object identifier to be part of the join statement. One or more views in the database may be identified, which may include the database object identifier. One or more edges in the one or more views may be identified, which may include the database object identifier. Scores for the one or more edges may be calculated. The edges may be filtered based on their scores according to one or more filtering rules. The filtered edges may be provided. A selected edge may be received, which may be selected from the provided filtered edges. The join statement may be generated in a query language. The join statement may be based on the selected edge. The generated join statement may be provided.

19 Claims, 19 Drawing Sheets

(56) References Cited

U.S. PATENT DOCUMENTS

| | | | |
|---|---|---|---|
| 7,376,668 B2* | 5/2008 | Smith | G06F 16/9535 |
| 7,480,669 B2 | 1/2009 | Lo et al. | |
| 7,644,361 B2* | 1/2010 | Wu | G06F 16/90328 |
| | | | 715/273 |
| 8,869,020 B2 | 10/2014 | Daga | |
| 9,317,557 B2 | 4/2016 | Shao et al. | |
| 9,400,815 B2 | 7/2016 | Poppitz | |
| 9,436,735 B1 | 9/2016 | Feng et al. | |
| 10,061,841 B2 | 8/2018 | Xiong et al. | |
| 10,176,220 B2 | 1/2019 | Pirahesh et al. | |
| 10,810,210 B2* | 10/2020 | Choudhury | G06F 21/552 |
| 2001/0034733 A1* | 10/2001 | Prompt | G06F 16/252 |
| 2003/0088558 A1 | 5/2003 | Zaharloudakis et al. | |
| 2004/0015783 A1* | 1/2004 | Lennon | G06F 16/242 |
| | | | 715/235 |
| 2004/0181543 A1* | 9/2004 | Wu | G06F 16/26 |
| 2005/0060647 A1* | 3/2005 | Doan | G06F 16/248 |
| | | | 715/205 |
| 2005/0097078 A1 | 5/2005 | Lohman et al. | |
| 2006/0101011 A1 | 5/2006 | Lindsay et al. | |
| 2006/0116849 A1 | 6/2006 | Legault et al. | |
| 2006/0117057 A1 | 6/2006 | Legault et al. | |
| 2006/0173873 A1* | 8/2006 | Prompt | G06F 16/258 |
| 2007/0276836 A1 | 11/2007 | Chaterjee et al. | |
| 2009/0019022 A1* | 1/2009 | Schallert | G06F 16/2465 |
| 2009/0043689 A1 | 2/2009 | Yang et al. | |
| 2011/0008801 A1 | 1/2011 | Camesano et al. | |
| 2015/0293512 A1 | 10/2015 | Egge | |
| 2016/0063043 A1 | 3/2016 | Carroll et al. | |
| 2016/0217423 A1 | 7/2016 | Magnan et al. | |
| 2016/0357787 A1 | 12/2016 | Kolata et al. | |
| 2017/0024488 A1* | 1/2017 | Henderson | G06F 16/273 |
| 2018/0024814 A1 | 1/2018 | Ouali | |
| 2019/0303405 A1 | 10/2019 | Kothari et al. | |
| 2020/0012171 A1 | 1/2020 | Yoshino et al. | |

OTHER PUBLICATIONS

"Association" SAP Help Portal, May 17, 2018, 3 pages.
"Alternative Keys," SAP Help Portal, May 17, 2018, 2 pages.
"Don't Try Coding ABAP Core Data Services Without Reading This First," Mar. 18, 2017, 10 pages.
"CDS Associations and Propagation with SQL in SAP HANA," May 17, 2018, 4 pages.
"SAP HANA Developer Guide," SAP HANA Platform 2.0 SPS 00, Nov. 30, 2016, 952 pages.
"Customizing and Extending Power Designer" PowerDesigner® 16.0, Sybase, Jul. 2011, 428 pages.
"CS 345: Topics in Data Warehousing," Oct. 12, 2004, 29 pages.
Notice of Allowance received in U.S. Appl. No. 16/220,886, dated Nov. 30, 2020, 11 pages.
Office Action received in U.S. Appl. No. 16/220,886, dated Aug. 5, 2020, 16 pages.

* cited by examiner

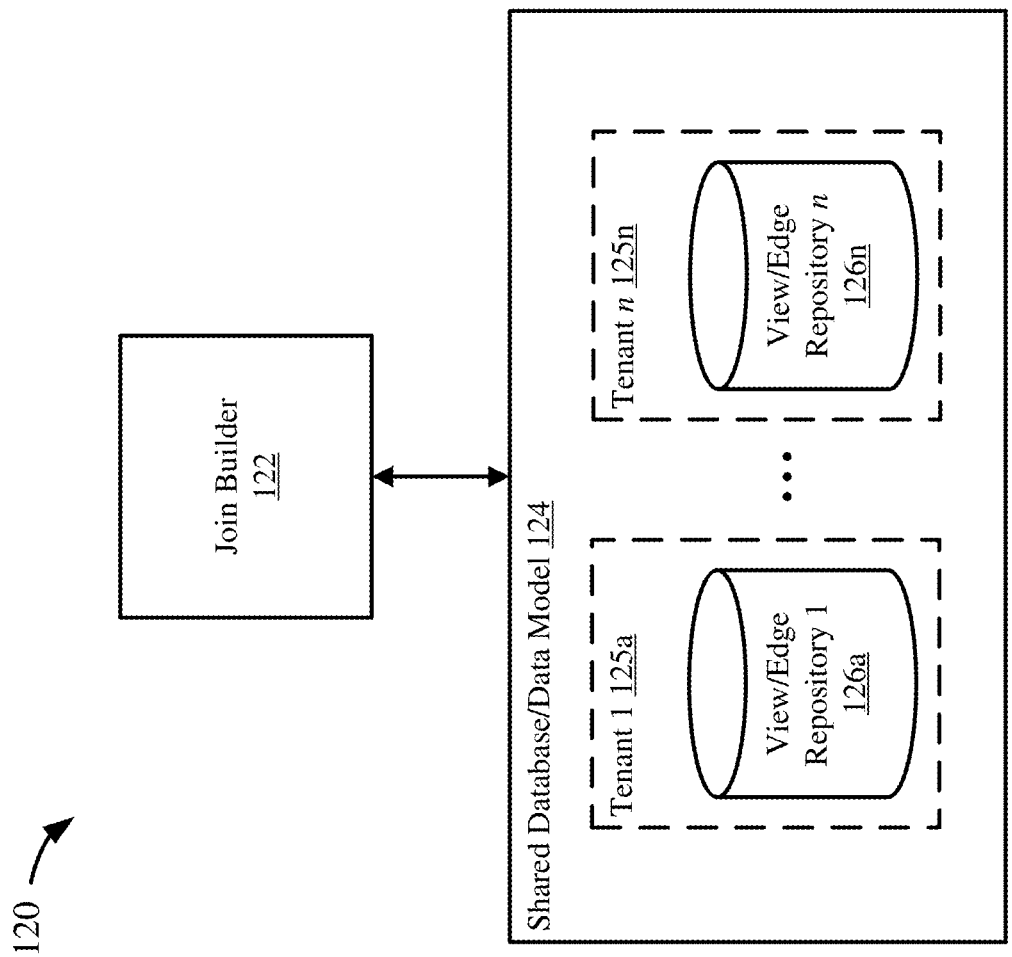

```
Editor

SELECT
    attr_1,
    5*attr_2 as aggregate,    ⎫
    attr3                      ⎬ 302
FROM                           ⎭
    Table_A
```

FIG. 3A

DYNAMIC GENERATION OF JOIN STATEMENTS FOR DATABASE OPERATIONS

FIELD

The present disclosure generally relates to view mining and generating join statements using existing data model knowledge. Particular implementations relate to collaborative join building, and systems and methods for identifying applicable existing views for use in developing join statements, such as for use in a database query or in defining a database view.

BACKGROUND

Enterprise data models are often very large and very complex, sometimes having thousands of entities, attributes, and relationships defined among the entities. While an enterprise data model may be well-documented, often they are not. Even when well-documented, such large data models generally require extensive documentation, and referencing such extensive documentation can be cumbersome while developing interfaces or reports for the data model. This can make development on enterprise data models expensive and slow. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system for view mining which performs a process for automatic join statement generation is provided herein. A request to generate a join statement may be received. The request may include a database object identifier to be part of the join statement. One or more views in the database may be identified. The views may include the database object identifier. One or more edges in the one or more views may be identified. The one or more edges may include the database object identifier. Respective scores for the respective one or more edges may be calculated. The one or more edges may be filtered based on their respective scores according to one or more filtering rules. The filtered edges may be provided. A selected edge may be received. The selected edge may be selected from the provided filtered edges. The join statement may be generated in a query language. The join statement may be based on the selected edge. The generated join statement may be provided.

A method for generating join statement recommendations to join one or more objects in a database is provided herein. A recommended join request may be received. The join request may include a table identifier for a table in the database. One or more current views in the database may be identified. The current views may include the table identifier. A plurality of edges in the current views may be identified. The respective edges in the plurality of edges may include the table identifier. Respective scores for the respective plurality of edges may be calculated. The plurality of edges may be filtered based on their respective calculated scores. A set of join statement recommendations may be generated based on the filtered plurality of edges. The generated set of join statement recommendations may be provided in response to the recommended join request.

A method for providing one or more proposed join options is provided herein. A request to generate a join statement for a database object may be received. One or more existing views applicable to the request may be identified. The identified views may respectively include the database object. One or more paths in the respective one or more identified views may be identified. The one or more paths may respectively include the database object. The paths may be provided as proposed join options.

The foregoing and other objects, features, and advantages of the invention will become more apparent from the following detailed description, which proceeds with reference to the accompanying figures.

BRIEF DESCRIPTION OF THE DRAWINGS

FIG. 1B is a schematic diagram depicting a join builder and multitenant database arrangement.

FIG. 3A is an example user interface with input code for a join builder.

DETAILED DESCRIPTION

Figure 1A:
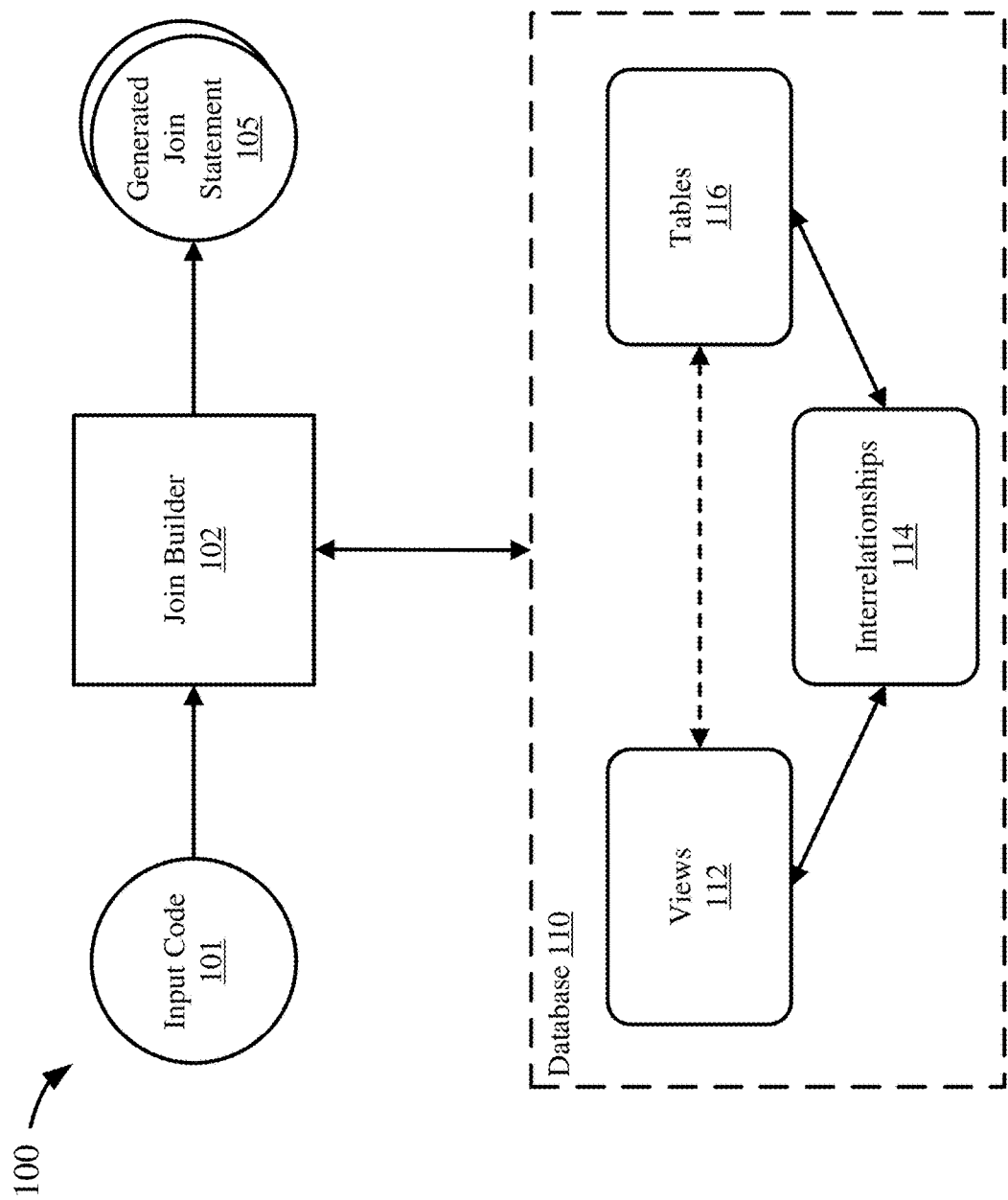
FIG. 1A is a schematic diagram depicting a join builder and database arrangement.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—View Mining for Join Development Overview

Join statements are an important part of many database operations or objects, such as queries or views. Join statements may be used in a database to aggregate or present data to a user in a way that is more useful to the user but may be different from the data model underlying the database. Typically, database normalization procedures can result in data being divided among a larger number of tables. While normalization can provide various benefits, a larger number of join statements, or more complex joins, may be necessary to re-associate data normalized into different tables.

Building views tailored to various uses is important for effective use of a database, and generally requires developing complicated or extensive join statements. However, this development process may be difficult or time-consuming, especially with databases that have thousands of tables and other data objects, with complicated interrelationships. As views are built, the multitude of views represent accumulated knowledge for join development in the database.

View mining for automatically developing (including suggesting or recommending) join statements according to the present disclosure uses the accumulation of view development knowledge from the existing, already developed views in a database to generate or recommend join statements. By mining existing views for relevant table (or other data object) relationships, new join statements can be automatically generated, or recommended, on the fly.

Such view mining may also improve the quality of the joins developed, by selecting data object (e.g. tables) combinations or interrelationships that are proven effective, such as by using existing data object relationships that meet preference criteria, such as relationships that are more commonly used or have been tested and found to be more efficient. A join in a defined view may have been more carefully thought out and prepared, such as by a database administrator or schema developer, and thus may considered to be higher quality than joins that are generated "on the fly" by users. Correspondingly, if a particular join, or elements of a join, are included in multiple views, the quality of the join or join elements may be even higher. In further cases, execution statistics for a view can be used as a measure of join quality, as a frequently used view may be presumed to be "better" than a view that exists, but is never accessed. Thus, "crowd-sourced" join statements may be generated from view mining as disclosed herein.

As the number of available views increases, view mining may become even more effective, providing more views to be mined, and thus more join statement options, including joins that may be more effective than those available on an isolated or smaller scale database system. For cloud-implemented databases (or other databases that are available broadly on a network), an even larger number of existing views may be made available for view mining, such as across multiple tenants in a multitenant database system.

View mining for generating join statements may be beneficial for developers for many reasons. For example, a database administrator or software developer may desire to build a view (or a query, or other database operation or object that includes a join) connecting Table X to Table Y containing field A and field B, but not have worked with the data model before. Even if the developer has worked with the data model before, determining how to connect, via one or more join statements, Tables X and Y and providing fields A and B may be difficult or laborious. By mining existing views for the data model, a join statement may be automatically generated that provides the request Tables X and Y with fields A and B.

Joins often have multiple join criterion, which may be difficult to track or develop efficiently. There may be many different options for joining two or more tables, which can be complicated for a developer, but may be remedied by mining existing views for common or preferred methods ("crowd-sourcing"). Further, join syntax may be difficult or exhaustingly extensive; for example, some fields may have well over 100 characters, which is not only difficult to remember or reproduce correctly, but becomes vastly more difficult as the number of such fields needed in a join increases (e.g. a join may have dozens of fields each of such a length). View mining may alleviate these issues by providing automatic recommendations or complete join statements.

Further, view mining allows for intelligent autocomplete of join statements. Unlike lexical autocomplete, which only considers specific text strings (e.g. words) and text matching, by mining views for substantive join information (e.g. which fields or which criterion to join with, or which objects to join), automatic join statement development as described herein may offer intelligent join autocomplete functionality by providing substantive suggestions, such as the next field or object to join, rather than merely the remaining text of a word.

View mining for automatic join statement generation or recommendation may be provided in an IDE, database management software, or other development environment or tool. Such tools may be SAP FSDP/FSDM™, HANA Native Data Warehouse™, PowerDesigner™, Enterprise Architect™, SAP HANA™, HANAWebIDE/Studio™, or combinations thereof, all by SAP SE of Walldorf, Germany.

In some cases, the existing views or the data model itself may be represented as a graph or set of graphs. Using a graph representation may improve the performance of view mining, as described herein. Further, graph representations may be exchangeable between database systems without requiring extensive copying of large databases or hiding sensitive database data, making the existing view knowledge transferrable between a wide range of systems.

Example 2—Join Builder with View Mining

FIG. 1A is a schematic diagram depicting a join builder and database arrangement 100. A join builder 102 may be used to mine data model information and relationships (e.g. defined connections between tables, such as joins, foreign keys, or other connections, such as an association from one table to an alternate key of another table) from existing views 112 to recommend or generate new join statements 105. A join builder 102 may receive as input one or more lines of program code 101. For example, the code 101 may be an SQL statement or partial statement, such as "SELECT var1, var2 FROM table1" or "FROM table1." In some cases, the program code 101 may not be actual code, but may be, or be input that includes, a table identifier or table name (e.g. "table1"), or a group of table names, which may include one or more field names.

The program code 101 may be received by the join builder 102 as part of a request to recommend or generate a join statement. The program code 101 may include references to specific fields or tables, such as tables 116, in a database 110; the program code may include references or identifiers to other data objects in the database as well, which may be used in a join statement. In a particular example, the program code 101, in the form of identifiers of tables or other objects to be joined, can be provided through a user interface, such as a graphical user interface.

The join builder 102 may identify a need for a join statement from the input code 101 (e.g., a user requests first data from a first table and second, related data from a second table), or the input code may be provided in an input join statement request. Such a join request may include one or more flags or indicators for automatically generating a join statement or requesting multiple recommended join statements. Such a request may further include join statement selection or generation criteria or rules, as described herein.

The join builder 102 may generate as outputs one or more join statements or partial join statements 105. Generally, the output join statements 105 will be in the same programming language as the input code 101 (e.g. input SQL code will result in output SQL code). In other cases, the output join statement 105 can be in a different programing language than the input code (e.g., the input code is in a different SQL dialect than the output code, or the input code references a data model that uses different table identifiers than a database layer, but which identifiers are mapped to the database layer). When the input code 101 is not code, but data object identifiers (e.g., table identifiers), the output join statement 105 can be program code, or can be a graphical or textual indication or description of suggested join operations.

The generated join statements 105 may be code, such as SQL code, for the join, or may be a partial join statement. For example, a generated join statement 105 may be "SELECT table1.var1, table2.var2 FROM table1 INNER JOIN table2 ON table1.var3=table2.var4." A partial generated join statement 105 may be "table1 INNER JOIN table2 ON table1.var3=table2.var4." Further, a partial generated join statement 105 may be only the portion of a join statement not included in the input code 101. For example, for input "SELECT table1.var1, table2.var2 FROM table1," the generated join statement may be "INNER JOIN table2 ON table1.var3=table2.var4." The generated join statement can, in at least some examples, be incorporated into the input code 101 in a way that complies with the syntax/semantics of the programming language (such as a query language). Generally, such a generated join statement 105 may be built based on the interrelationships 114 in the database 110.

In some embodiments, the join builder 102 may generate as part of the generated join statement 105 a non-code statement in addition to (or in place of) the join statement. For example, the generated join statement 105 (e.g. "SELECT table1.var1, table2.var2 FROM table INNER JOIN table2 ON table1.var3=table2.var4") may include a text phrase or string explaining the output join statement, such as "Auto Join to Table 2 on var3 and var3." Such non-code statements may be in addition to the generated join code 105, and may be in a natural language or pseudocode. Such natural language or pseudocode statements may be easier for a developer, administrator, or other user to read or understand (especially in cases where the join statement is especially long or complicated), which may also make selecting between multiple recommended generated join statements faster or otherwise easier as well. Non-code statements can stored in metadata for the join statement 105, or can be included in the join statement (e.g., in a "comment" syntax of the programming language).

The join builder 102 may access the database 110 based on the input code 101. The database 110 may store views 112, tables 116, and interrelationships 114 between the views and the tables. The interrelationships 114 may also be between separate views 112, or between separate tables 116. The interrelationships 114 may be between the views 112 and/or tables 116 themselves, or between particular fields of the views or tables. For example, the interrelationships 114 may represent or include foreign key fields (or associations) in a table that reference other tables. The interrelationships 114 may be join statements between the tables 116, views 112, or between a combination of tables and views. The interrelationships 114 may be considered to be edges linking two or more data objects, which may be in a graph, (such as views 112 or tables 116) by distinct fields in each data object, where the data objects can serve as vertices of the graph. Edges may be the interrelationships 114, or representations of the interrelationships, such as in a graph representation of tables or views, as described herein. Edges may be paths or connections between two data objects in a database or data model (e.g. tables, views, stored procedures), such as foreign keys or associations. Edges may be further defined by specific fields or sub-objects between the connected data objects. In one example, an edge may be defined as a class storing references to the connected data objects, such as in the following pseudocode (an edge connecting A to B, where "vertice" may be a field storing a reference to the data objects, or a data object itself storing a reference and other information about the data objects):

class Edge {
   Vertice A;
   Vertice B;
   [additional data fields];
};

In some cases, an edge may include multiple connections through multiple intermediate data objects to connect two data objects (e.g. edge A to B may go through C, without a direct connection between A and B). More commonly, a series or set of edges may be integrated together to form a path (e.g. array, linked list), connecting separate data objects (e.g. edge A to C and edge C to B may be in a set to form a path connecting A to B). Thus, a path may be a single edge connecting data objects or multiple edges together connecting the data objects.

The join builder 102 may access the database 110, and thereby access views 112, tables 116, and interrelationships 114 directly. The join builder 102 may access a data dictionary, information schema, or other database file or object in (or associated with) the database 110 that contains information on the views 112, tables 116, and interrelationships 114, in place of (or in addition to, in some cases) accessing the views or tables directly. In some embodiments, the join builder may access a data model, such as a schema or set of schema files for the database 110, in place of accessing the database itself. That is, the join builder may access alternate files in place of the database 110 that contain information that describes entities and relationships, and views defined between entities, that describe the database 110, which can be useful for the join builder (which thus may not require access to database data or to a database management system).

Example 3—Join Builder with Multitenancy

FIG. 1B is a schematic diagram depicting a join builder and multitenant database arrangement 120. A join builder 122 may be used to mine data model information and relationships (e.g. defined connections between tables) from a shared database or data model 124, similar to FIG. 1A. The shared database or data model 124 may reside on a network (e.g. in the cloud) and may have one or more tenants, such as Tenants 1-n 125a-n, which access or otherwise use the shared database.

The tenants 125a-n may have their own respective sets of views in the database 124, such as View/Edge Repository 1 126a for Tenant 1 125a through View/Edge Repository n 126n for Tenant n 125n. The view repositories 126a-n may include views or programming scripts for views, data dictionaries, or graphical representations of views (or database relationships or edges). The view repositories 126a-n may reside outside tenant portions of the shared database 124 (e.g. secured data portions maintained separate from other tenants), so as to allow access by the join builder 122 without allowing access to sensitive or confidential tenant information or data. The view repositories 126a-n may have any sensitive or confidential information masked or removed, or may have all data removed and only contain the relational definitions or representations of the views (e.g. a graph representation of the views, or other cluster/edge representation).

The join builder 122 may access some or all of the view repositories 126a-n when mining the shared database 124. In this way, the broad knowledge developed across multiple tenants, and database developers or administrators of those tenants, may be accessed and used through view mining, as described herein, to auto-generate or recommend join statements, including portions of join statements.

Example 4—View Mining Process for Edges

Figure 2A:
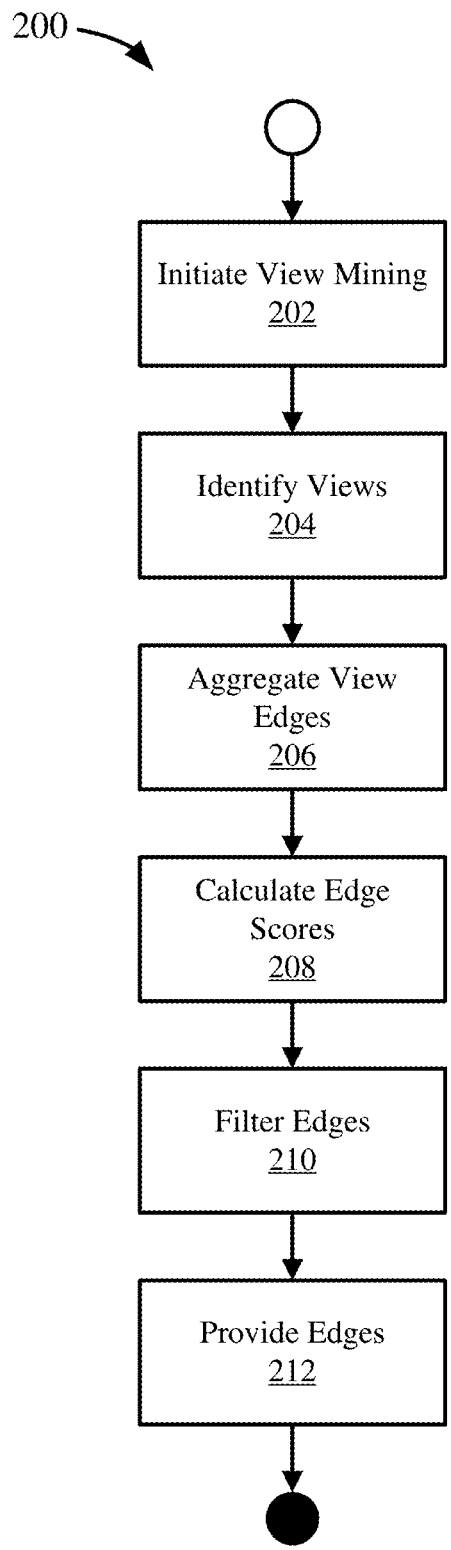
FIG. 2A is a flowchart illustrating a process for mining one or more views for paths or edges for generating join statements.

FIG. 2A is a flowchart illustrating a process 200 for mining one or more views for paths or edges, such as may be used in generating join statements as described herein.

View mining may be initiated at 202. View mining may be initiated at 202 through a program interface, such by executing a program implementing process 200, executing a script, calling an API or program function, accessing the process as a service (e.g. SaaS), or so on. In other cases, view mining can be initiated at 202 through a user interface, such as by receiving a view mining request through a graphical user interface. In some embodiments, the process 200 may be embedded within another process, such as process 220 shown in FIG. 2B. Initiating view mining at 202 may include accessing a database or data model (e.g. schema files or data dictionary).

Initiating view mining at 202 may include receiving a view mining request. Such a view mining request may include a reference or identifier to a database or a data model for which the view should be mined. In other cases, the database or data model identifier can be omitted, such as if an application providing the process 200 is configured to access one or more databases, data models, or combinations thereof. A view mining request may further include identifiers or references for one or more specific data objects, such as tables or views, within the database or data model to analyze. A view mining request may also include other parameters as well, such as applicability variables for selecting applicable views or edges (e.g. views accessed a minimum number of times, or views created by certain users or tenants), threshold variables or other filtering criteria, and so on. In some embodiments, such additional parameters may be available for the process 200 without being provided in a view mining request, such as being available in a program registry or configuration settings.

One or more views may be identified at 204 for mining. Identifying the views at 204 may include finding some or all of the existing views for the target database or data model (or other repository of view or join information). A database object, such as a data dictionary, may be accessed to determine which views are available. In some cases, not all views will be mined and instead the set of views analyzed may be limited, such as by applicability criteria provided in a view mining request or by rules executed against the available views. For example, in some cases only new views (new since the last time the database views were mined) may be mined (and the results stored with previously generated results) or only views that are commonly accessed (e.g. views with an access frequency or count higher than a given threshold) are mined. A database object, such as a data dictionary (or a graph model representation or edge repository of the database/data model), may be accessed to analyze the views, which may include determining which views contain the requested data objects for the join statement. In some cases, the views themselves may be accessed to determine which views are applicable, or otherwise are accessed to be mined/analyzed.

One or more edges in the identified views may be aggregated at 206. An edge as identified at 206 may be a path between two or more data objects (e.g. tables) in the database that is used in an identified view, and which may be used to combine the data objects. An edge or path may include the specific fields, such as foreign keys or associations, used to combine the two data objects. For example, an edge may be the set of fields, such Field1 in Table A and Field2 in Table B, that link or combine Table A and Table B. Each edge may be identified by the data objects it links and the fields or other data object attributes used for that link.

Generally, most or all edges are aggregated from the views at 206. Such edges may be aggregated into a data structure or other data variable, such as a hash table, a map table, or an array. In some cases, some views may have the same edges as other views. That is, one or more edges of one view may be identical to one or more edges of another view. For example, an edge connecting Table A and Table B using Field1 and Field2 may be found in multiple views. In such cases, both edges may be aggregated separately, such that there are repeat edges available in the set of aggregated edges. In other cases, the duplicate edges may be stored once, but a count or weight variable for the edge may be increased. Note that two views or other join sources can have identical edges, even while other portions of the view definition or join statements differ.

Scores for the aggregated edges may be calculated at 208. Calculating the edge scores at 208 may include determining the frequencies of each aggregated edge. Determining the frequency of the edges may include counting the number of occurrences in the identified views (or, in some cases, all accessible views even if not identified for analysis) of a given edge. Determining the edge frequencies may be similar to deduplicating, while maintaining a count of, the aggregated edges from 206.

Alternatively or additionally, scores may be calculated for the aggregated edges at 208 by a scoring function or formula. For example, a weighting formula may be used to calculate the edge scores. Such a weighting formula may be the weighting formula $1-1/f$, where $f$ is the frequency of the edge. Other scoring or weighting formulas may be used, and may utilize other edge attributes or criteria, such as edge efficiency (e.g. access time or resource usage metric collected or maintained by the database management system for the given connection/path between data objects) or the number of times views having the edge are accessed (e.g. views more often accessed may have more meaningful or useful edges), and so on. The score calculation may thus utilize "crowd knowledge" or "swarm intelligence" (e.g. the frequency of use of a path) to determine the value or usefulness of a given partial path.

For example, an edge may have a frequency of 10 because it is implemented in 10 places in the database (e.g. it is used in 10 views). In some embodiments, the edge score may be simply the frequency of use, such as 10. In other embodiments, the edge score may be calculated using the weighting formula example above. Thus, where the frequency is 10, the edge score using the formula $1-1/f$ may be 0.9 ($1-1/10$). In other embodiments, other scoring formulas or criteria may be used. For example, a frequency of 10 may give the edge a score of "medium" on a scale of "low; medium; high."

Edges may be filtered from the aggregated edges at 210. Filtering at 210 may include determining the relevance or importance of an edge, such as by comparing the edge score to a threshold. Such a threshold may be a static value or variable, or may be calculated proportionally, or relative, to the other edges (e.g. frequency of a given edge compared to total number of edges). Other criteria or edge metadata (e.g. edge efficiency or instantiation rate) may be used in filtering edges.

In some embodiments, the edges may be filtered based on a received view mining request, which may specify one or more criteria for filtering. In other embodiments, the edges may not be filtered, or may be filtered at a later stage or another system or process that receives the set of aggregated edges. Filtered edges may be removed from the set of aggregated views. Alternatively, filtered edges may remain in the set of aggregated views, but have a filtered flag or other indicator set to represent that the edge is filtered.

Filtering the edges may improve the mined results. For example, a given table may be used in 1000 different joins in the views, but only three of those 1000 join are used more than once. Thus, the 1000 different joins for the table may be filtered to only the three most common (e.g. relevant) joins. Three options is much simpler set of join options, and thereby may make selecting a join option easier.

The aggregated or filtered edges may be provided at 212. Generally, at 212, the calculated edge scores from 208 may be provided along with their associated edges, as well. In some implementations, any other identified or calculated attributes or metadata of the edges (e.g. path efficiency) may also be provided. The edges and scores may be provided at 212 through an API or other programmatic interface, such as a return results from a function call or table results from a query. Alternatively or additionally, the edges and associated scores may be provided to a user via a user interface.

In some embodiments, the process 200 may be run as a batch process or other scheduled task in a database, and results maintained in a data file or other set of edges. In other embodiments, the process 200 may be initiated by a database administrator or other user, or may be integrated with another process or database function, such as process 220 shown in FIG. 2B.

Example 5—Join Statement Generation

Figure 2B:
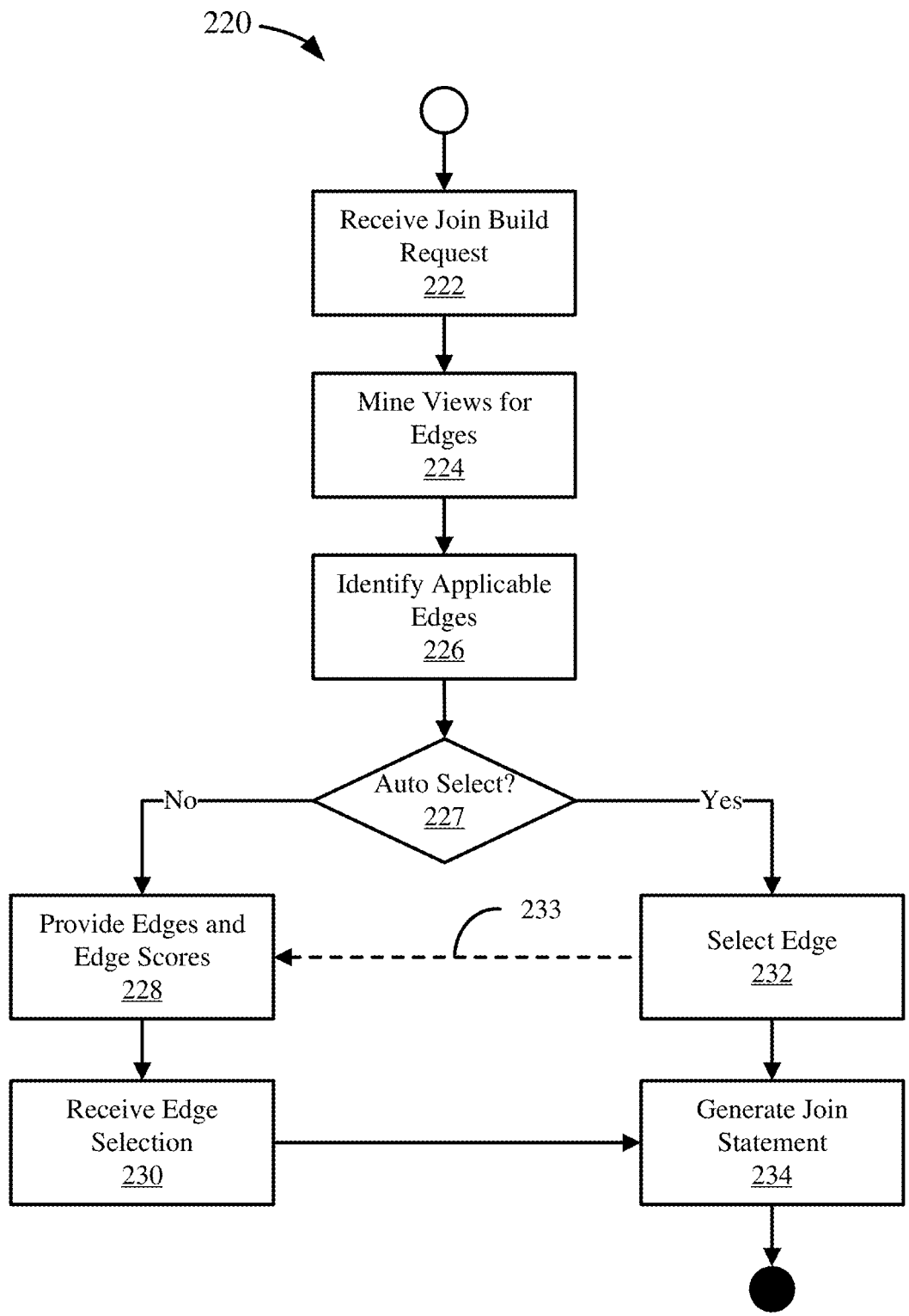
FIG. 2B is a flowchart illustrating a process for building a join statement using view mining.

FIG. 2B is a flowchart illustrating a process 220 for building a join statement using view mining. A request to build a join statement may be received at 222. The join-building request at 222 may include a reference or identifier to a database or a data model from which the join should be built. In other cases, the database or data model identifier can be omitted. The request at 222 may include identifiers for one or more data objects, such as tables (including for particular fields of particular tables), within the database or data model to combine using a join statement. The request at 222 may include a code statement or partial code statement, such as an SQL statement or query, as described herein; one or more data objects (e.g. tables) may be identified from such a code statement. The request at 222 may include other parameters as well, such as an indicator to auto-generate a join statement or provide join options to a user, or one or more criteria to use in determining how to build the join statement. In yet further cases, the request at 222 does not include code, but can include one or more of database or data model identifiers, data object identifiers, or join criteria (e.g., edge filtering criteria). In some embodiments, multiple join statements may be requested simultaneously or within the same request at 222.

One or more views may be mined at 224 for edges or paths from which to generate one or more join statements as requested at 222. Mining the views at 224 may include executing the process 200 shown in FIG. 2A, in whole or in part, or as otherwise described herein. The join-build request received at 222 may include some or all of a request to initiate view mining, as at 202 in process 200; formatting or reformatting such a request may be accomplished as part of mining the views at 224.

One or more applicable edges may be identified at 226 from the mined edges as determined at 224. An applicable edge as identified at 226 may be an edge that includes one or more (including two or more) of the data objects (e.g. tables) for which a join statement is to be generated, as requested at 222. For example, if a join statement on Table A is requested at 222, an applicable edge may be any edge that includes Table A (e.g. any path that is connected to or otherwise includes Table A). In some embodiments, identifying the applicable edges, as at 226, may be integrated with the view mining, as at 224, such as during the edge filtering (e.g. at 210 in process 200) or edge aggregation (e.g. at 206 in process 200).

The process 220 may determine at 227 how to proceed with the identified applicable edges from 226, which may be accomplished with an auto-select flag or indicator. An auto-select indicator may be received as part of a join-building request at 222, or may be otherwise configured and stored, for example, as a user-configurable registry setting, for the process 220.

If the process 220 determines to auto-select an edge ("yes" at 227), an applicable edge may be selected at 232 from the set of applicable edges generated at 226. An edge may be selected at 232 from the applicable edges from 226 based on their respective scores, generally calculated as part of view mining at 224. The selecting at 232 may include taking the edge with the highest or lowest score (depending on the scoring function), or a score that exceeds or is below a threshold, or a score that meets some other criteria or rule(s). The scores may be used in combination with other edge attributes (which may also be factors in the scores), such as frequency of use or edge efficiency (e.g., statistics maintained by a query optimizer or other database management or administration component).

Alternatively or additionally, an edge may be selected at 232 based on a frequency of use of the edge within the database or data model (e.g. a count of the number of times the edge is used in views in the database, the number of times the edge was executed, such as executed over a certain time period). As a further alternative or addition, an edge may be selected at 232 based on additional selection criteria or rules. For example, an edge may be selected based on edge complexity (e.g. the number of fields or other attributes that define the edge), edge efficiency value, or a combination of edge frequency and edge efficiency, or edge frequency or efficiency exceeding a given threshold, or edge complexity below a given threshold while edge efficiency is above another threshold, or so on. Such rules or criteria may be user-configurable, and may be combined or arranged in a hierarchy (for example, how to resolve "ties" or otherwise to classify some rules as higher priority than others).

An edge may be selected at 232 for each requested join statement to be generated. Thus, multiple edges, or sets of edges, may be selected. For example, if a join is requested at 222 to for Table A and another join for Table B (but Table A is not necessarily to be joined to Table B), an edge may be selected to for Table A, and another edge may be selected to for Table B.

In some embodiments, multiple edges may be selected for a single join statement. For example, a join for Table A may be requested, which may provide an edge connecting Table A to Table X and another edge connecting to Table Y. The edge connecting Table A to X may be selected while the edge connecting Table A to Y may also be selected, the combination of which may form complex join.

In some scenarios, an edge may not be selected at 232 because a preferred or optimal edge may not be identifiable. For example, two edges may have the same score, or frequency of use, or meet the same selection criteria (or have no attributes upon which to select). In such cases, the process 220 may direct the edges at 233 to be provided at 228, such as to a user, as described herein. Or, and edge can be selected randomly, or according to other criteria, rather than proceeding to 228 if no optimal edge is identified.

A join statement may be generated at 234 based on the selected edge(s) from 230 or 232. Generating a join statement at 234 may include generating source code, such as SQL code, for a join based on the selected edge. In some embodiments, the source code may be stored in the database (or other data file or location), or returned, such as in response to an API call or an RFC. In some cases, the generated source code may be displayed to a user through a user interface, which may further allow editing or other refinement of the generated source code. Generally, the generated join statement may be passed to be incorporated into or with other code for which the join statement is intended, such as code included or used to initiate a request at 222.

If the process 220 determines not to auto-select an edge ("no" at 227), the applicable edges from 226 may be provided at 228. Generally, the edge scores from view mining at 224 may be provided along with their associated edges, as well. Any other identified or calculated attributes or metadata of the edges (e.g. edge efficiency or frequency) may also be provided at 224. The applicable edges and scores may be provided at 228 via a user interface, or through an API or other programmatic interface. In some embodiments, the applicable edges may be sorted before being provided at 228, such as by score or frequency.

An edge selection may be received at 230. In some cases, where multiple join statements were requested to be generated at 222, a separate edge selection may be received at 230 for some or all of the separate join statements requested. The edge selection(s) may be received at 230 through a user interface, for example, or through an API or other programmatic interface.

Once an edge selection(s) is received, a join statement may be generated at 234 based on the edge selection(s) from 228, as described herein.

In some embodiments, an auto-select determination at 227 may not be implemented, and either process portion from 227 (steps 232 and 234 under "yes," or steps 228, 230, and 234 under "no") may be implemented as the entire version of the process 220.

Example 6—Automatic View Mining with Join Generation Scenario

Figure 2C:
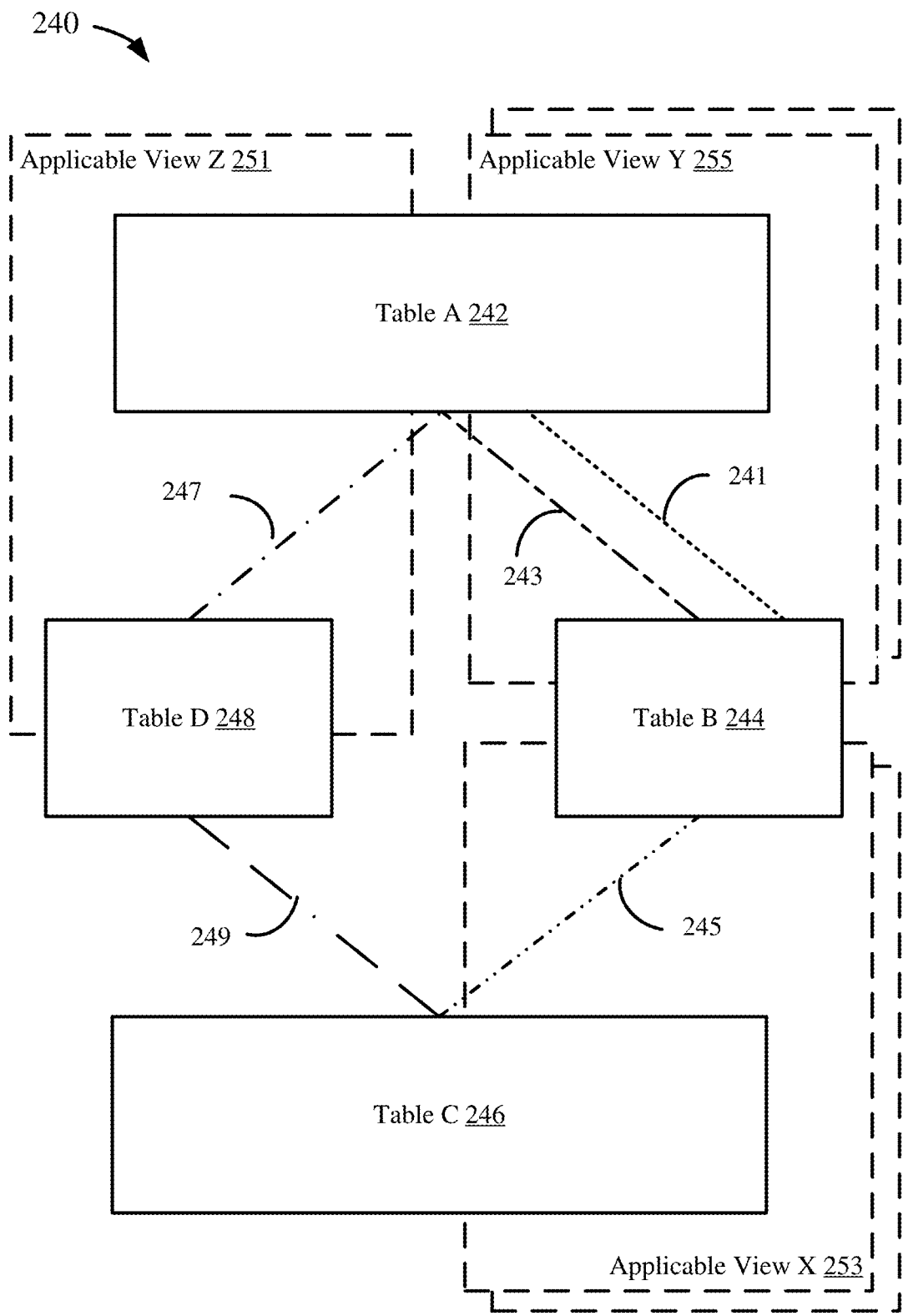
FIG. 2C illustrates an example set of views, data objects, and paths for use in view building with complete paths.

FIG. 2C illustrates an example 240 set of views, data objects (tables), and paths for use in join building, such as by the process 200 shown in FIG. 2A and the process 220 shown in FIG. 2B. A request may be made (e.g. at 222 in FIG. 2B) to generate a join statement including Table A 242 within a database or data model.

Several views 251, 253, 255 may be identified for mining (e.g. at 204 in FIG. 2A); this may include all views or may be limited to views that contain Table A 242. Generally, the views contain references to the tables, or data pulled from the tables, but not the tables themselves. Applicable View Z 251 may contain Table A 242 and Table D 248, having edge (e.g. relationship or path) 247; Applicable View X 253 (and additional views) may contain Table B 244 and Table C 246, having edge 245; Applicable View Y 255 (and additional views) may contain Table B 244 and Table A 242, having edges 241, 243. These views 251, 253, 255 may also contain additional tables or database objects, and associated edges, that are not illustrated in FIG. 2A.

Table C 246 and Table D 248 may have an edge 249, which may not be implemented in a view but may be identified from a data dictionary or other definitional object (e.g. the tables themselves or a graph representation of existing views). Such a scenario may be useful, for example, if an edge between two data objects cannot be found in the existing views, but an edge is known or otherwise defined in the database or data model. For this example 240, edge 249 may alternatively be considered to be in a view that is none of the shown views 251, 253, 255.

The edges 241, 243, 245, 247, 249 may be mined (e.g. at 224 in FIG. 2B) or aggregated (e.g. at 206 in FIG. 2A). A first edge identified may be the edge in Applicable View Z 251, which is the connection 247 from Table A 242 to Table D 248. Edge 247 may further be identified as connecting Table A 242 and Table D 248 on fields L and M (not shown), e.g. join fields or foreign keys or associations or both, which may be included with the edge. Edge 247 may be represented as EdgeAD, EdgeAD_1, EdgeAD_LM, or some other ordered set (e.g. variables in an array, linked list, or other data structure, or values arranged in a tuple) or identifier.

Second and third edges identified may be the edges in Applicable View Y 255, which are the connections 241 and 243 from Table A 242 to Table B 244, and which are based on different combinations of fields in Tables A and B. Edge 241 may further be identified as connecting Table A 242 and Table B 244 on fields I and J (not shown), e.g. join fields or foreign keys or associations or both, which may be included with the edge. Edge 241 may be represented as EdgeAB_1 or EdgeAB_IJ, or some other ordered set (e.g. variables in an array, linked list, or other data structure, or in a tuple) or identifier. Edge 243 may further be identified as connecting Table A 242 and Table B 244 on field K (not shown), e.g. join field or foreign key or association or both, which may be included with the edge. Edge 243 may be represented as EdgeAB_2 or EdgeAB_K, or some other ordered set (e.g. variables in an array, linked list, or other data structure, or in a tuple) or identifier. In other examples or embodiments, edge 241 and edge 243 may be in different views and not in the same view.

A fourth edge identified may be the edge in Applicable View X 253, which is the connection 245 from Table B 244 to Table C 246. Edge 245 may further be identified as connecting Table B 244 to Table C 246 on field N (not shown), e.g. join field or foreign key or association or both, which may be included with the edge. Edge 245 may be represented as EdgeBC, EdgeBC_1, EdgeBC_N, or some other ordered set (e.g. variables in an array, linked list, or other data structure, or in a tuple) or identifier.

A fifth edge identified may be the edge 249 combining Table D 248 with Table C 246. Edge 249 may further be identified as connecting Table D 248 with Table C 246 on fields O, P, and Q (not shown), e.g. join fields or foreign keys or associations or both, which may be included with the edge. Edge 249 may be represented as EdgeDC, EdgeDC_1, EdgeDC_OPQ, or some other ordered set (e.g. variables in an array, linked list, or other data structure, or in a tuple) or identifier.

Edges 241, 243, 245 may identified in multiple views each, together or separately. That is, multiple views may have edge 241, multiple views may have both edges 241 and 243, and so on.

A number of times an edge 241, 243, 245, 247, 249 is found in the applicable views may be counted (e.g. at 208 in FIG. 2A or 224 in FIG. 2B). The number of times a particular edge is used in the existing views (or, the number of times a particular edge is included in execution of a view) may indicate the usefulness or effectiveness of the edge (as in, the more an edge was used previously by being coded into a view, the more likely that edge is better to use). Thus, the edge AB_1 241 may have a frequency of 10 if found in use in 10 views, while edge AB_2 243 may have a frequency of 4 if found in 4 views. Further, edge AD 247 may have a frequency of 8, edge BC 245 may have a frequency of 9, and edge DC 249 may have a frequency of 1 (or zero, if not actually implemented).

A score for each edge 241, 243, 245, 247, 249 may be calculated using a scoring function (e.g. at 208 in FIG. 2A or at 224 in FIG. 2B). In some cases, such as for this example 240, the score may be the frequency count for the edges, as previously described. The edges 241, 243, 245, 247, 249 may be filtered based on the scores or frequency count (e.g. at 210 in FIG. 2A or at 223 in FIG. 2B). For example, any edge below a frequency threshold may be filtered. Thus, if the frequency threshold is 5, edges AB_2 243 (having a frequency of 4) and DC 249 (having a frequency of 1 or 0) may be filtered as they both have frequencies below the threshold. Alternatively, the threshold may be a minimum percentage of the total edges found (e.g. the score is the frequency count divided by the total number of edges counted, and this may be filtered compared to a threshold percentage or ratio value).

For a request for a join statement on Table A 242, edges AB_1 241, AB_2 243, and AD 247 may be identified as applicable for a Table A join (e.g. at 226 in FIG. 2B or at 210 in FIG. 2A). Thus, these edges 241, 243, 247 may be provided as results for a join on Table A request (e.g. at 228 in FIG. 2B or 212 in FIG. 2A), or may be selected from (e.g. at 232 in FIG. 2B) to generate a join statement.

Such results may be provided, such as in a user interface (e.g. at 228 in FIG. 2B) or may be selected from automatically (e.g. at 232 in FIG. 2B). If automatically selected based on score, edge AB_1 241 may be selected as it has the better (e.g. higher) score, with a frequency of 10, compared to the other available and applicable edges. Once this path is known and selected, a join statement may be automatically generated, or developed by a user, based on the path (e.g. at 234 in FIG. 2B).

Example 7—Join Statement Generation Pseudocode

The following pseudocode represents one embodiment of aggregating edges and filtering edges, as described herein, when implementing view mining against views in a database, such as may be represented as graphs.

HashMap<Edge, Integer> edgeUsage;
For each Edge e in AllEdges:

```
edgeUsage.add(aggregateUsages(e));
function boolean isAboveThreshold(Edge e, double threshold){
    if edgeUsage.get(e) / edgeUsage.reduce((a,b) -> b).sum > threshold:
        return true;
    else return false;
}
```

The following pseudocode represents one embodiment of generating join statement recommendations, as described herein, when implementing view mining against views in a database, such as may be represented as graphs.

```
function List<Edge> makeProposal(Table userPosition){
    Set<Edge> edges = getEdgesInWhichTableIsInvolved(userPosition);
    edges.filter(isAboveThreshold); //
    List<Edge> result = new List( );
    result.addAll(edges);
    sortAccordingToEdgeFrequency(result);
    return result;
}
```

Example 8—User Interface Join Statement Generation Scenario

FIG. 3A is an example user interface 300 with input code 302 for a join builder. A user interface 300 may be a text editor or integrated development environment (IDE) into which a user (e.g. database administrator, programmer) may enter program code. Such program code may be input code to a join builder, as described herein. For example, code 302 may be an SQL statement for a database query. Some or all of the code 302 may be input to a join builder or otherwise used in a join statement generation processes, as described herein. For example, "FROM Table_A" may be provided as input to a join builder, or the entire SELECT statement 302 may be provided as input. The code 302 may be input as a user types the code, or may be input after a pause or break in typing, recognition of a suitable number of tokens, a keyboard command, or may be input by the selection of a widget in the user interface.

Figure 3B:
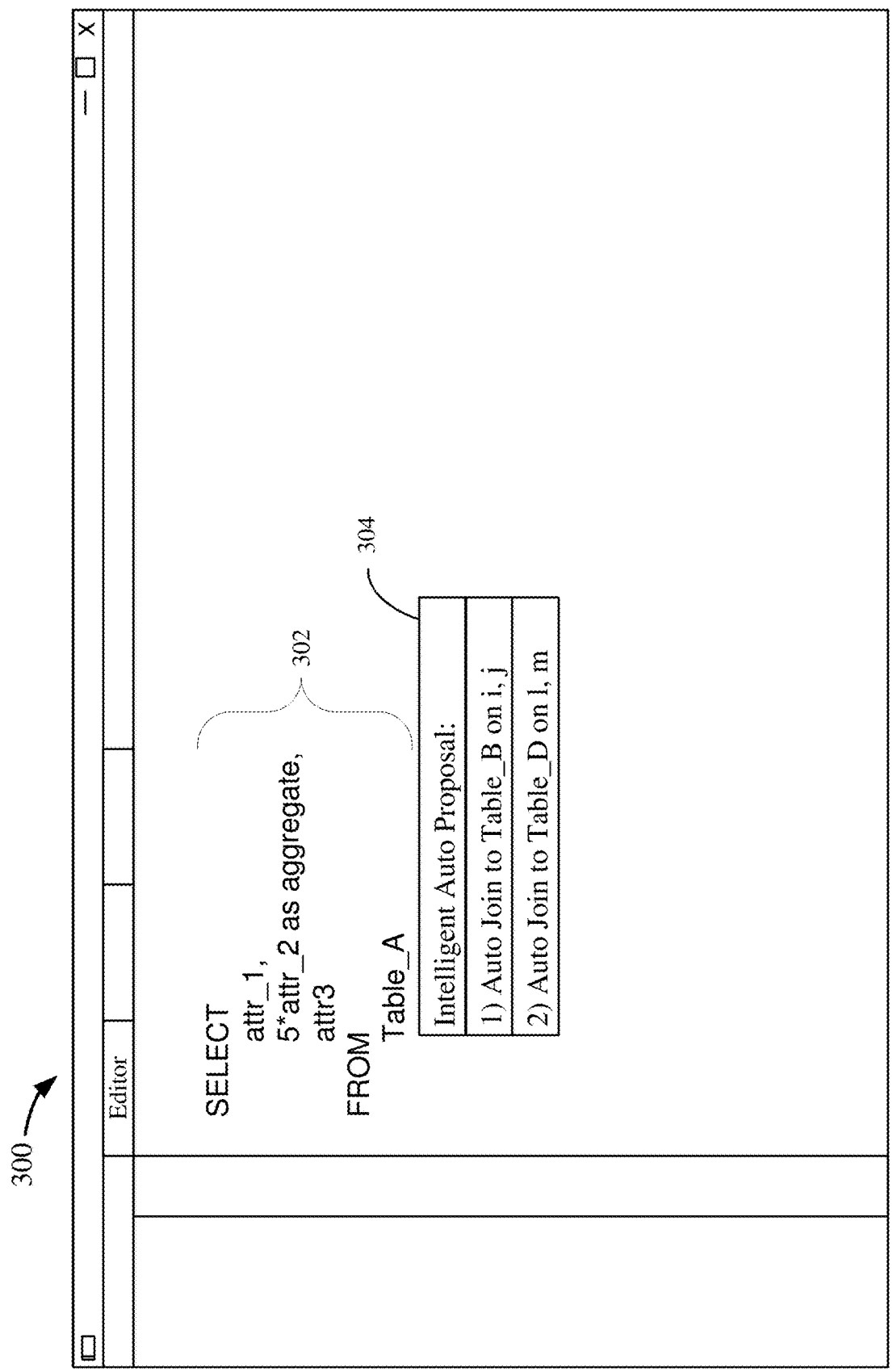
FIG. 3B is an example user interface with input code displaying generated join statement options.

FIG. 3B is the example user interface 300 with input code 302 displaying generated join statement options 304. The join statement options 304 may be provided via a pop-up window or widget where the join statement may be inserted (e.g. near or with the input code 302). In some cases, the join statement options 304 may be provided where the user was typing. One or more join statement options 304 may be provided, and may be provided in explanatory or more natural language text. In other embodiments, the provided join statement options 304 may be in the applicable (e.g. SQL) programming language. The join statement options 304 may be sorted based on their scores (e.g. the better score options appear higher in the list). In some embodiments, the scores may be provided in the options 304. Other metrics, as described herein, may also be provided, such as the origin view(s). The provided join statement options 304 may be selectable by the user.

Figure 3C:
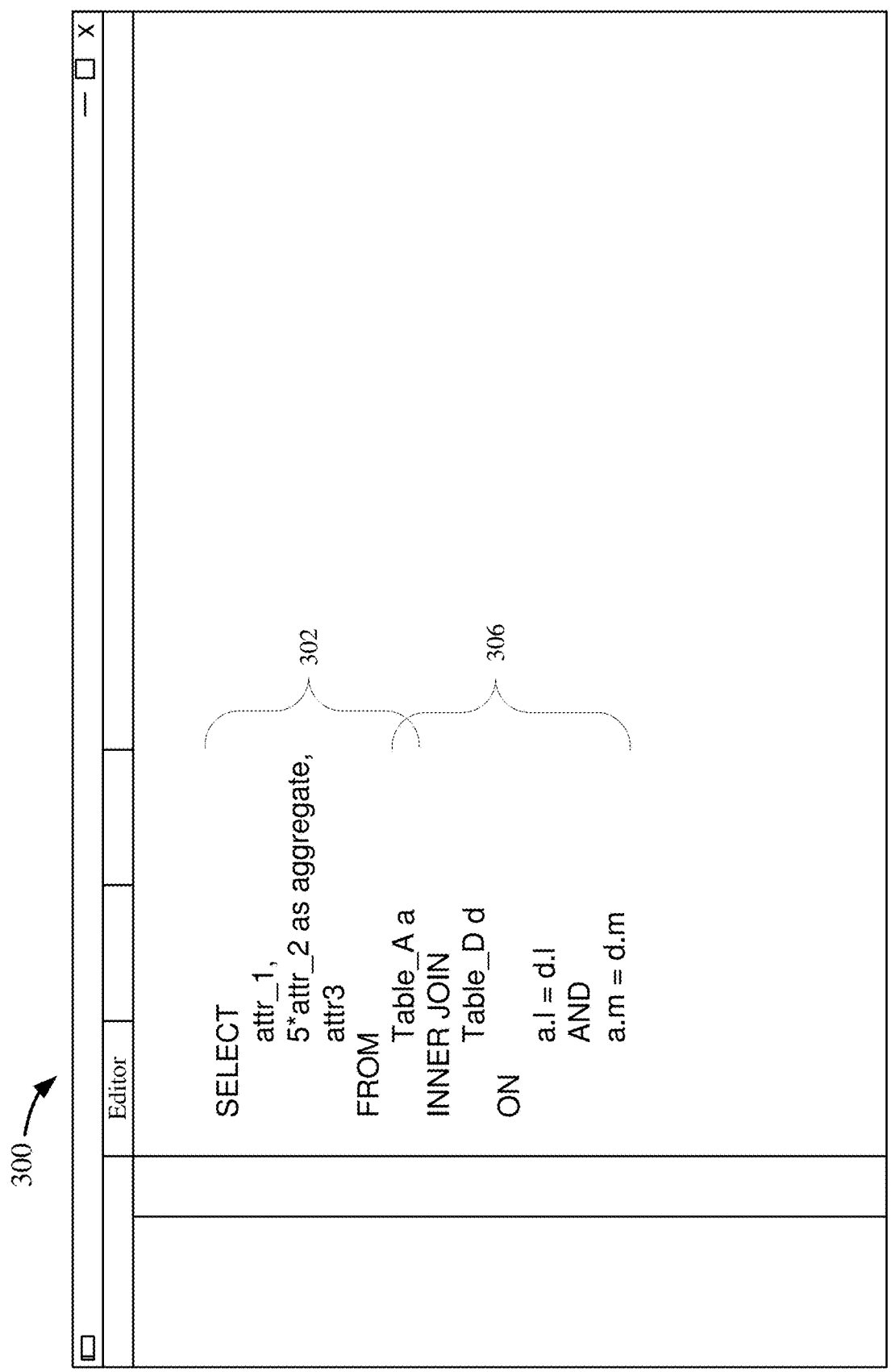
FIG. 3C is an example user interface with input code and generated join statement code.

FIG. 3C is the example user interface 300 with input code 302 and generated join statement code 306. Once a user selects a join statement option from 304, shown in FIG. 3B, the selected join statement code 306 may be inserted into the input code 302. For example, the join statement may be added to the end of the input code 302, as shown in FIG. 3C, or otherwise at the syntactically/semantically correct location for a given programming language. In some embodiments, the join statement code may be generated after the join statement option has been selected; in other embodiments, the join statement code may be already generated when the options are presented (or be generated in the background while presented) and so need only be inserted once selected.

As shown in FIGS. 3A-C, the join statement generation functionality as described herein may be implemented as an in-line, dynamic process while a user types or otherwise edits source code for a program or database object. Such a process may be considered to be an "autocomplete" process. In some embodiments, the join statement generation functionality may process while a user types, generating options as a user's typed input is passed to the join statement generation builder/process. Thus, as a user provides additional information, the join statement options may be refined or narrowed, often as the user types. Generating join statements or options may be done iteratively, as well, as a user selects a join option, which gets inserted, and then edits the join or adds additional information (e.g. types in more code or identifiers).

Example 9—View Mining Using Graph Representation

View mining, as disclosed herein, may be executed against graph representations of views in a database. In a graph representation, a given database model or schema may be represented as a graph, where individual tables can be represented as nodes or vertexes in the graph, and relationships between tables can be represented as edges. View mining may include traversing these nodes and identifying relevant edges.

In at least some aspects, one or more of the tables are connected by multiple edges. For example, multiple pathways between selected database objects may exist through a single set of one or more attributes of a table (e.g., one or more tables may use the single set as a foreign key or an association to an alternate key). Or, pathways may exist through different sets of one or more table attributes (e.g., one table can use a foreign key and another table can use an association to an alternate key).

A path determination method can determine paths between tables during view mining, and may include information regarding edges particular sets of one or more attributes in each of the two connected tables. Utilizing a graph representation may allow for a larger number of paths to be analyzed, and may include more granular path information, which can increase efficiency by allowing a join builder to select paths with a reduced number of nodes needed for a query, or otherwise choose a path that increases efficiency or best suits requested criteria.

The availability of multiple paths can increase efficiency by allowing tables to be chosen that can most efficiently be searched. For example, a longer path that includes tables with a smaller number of records may be more efficient than a shorter path that includes a larger number of records. Or, tables can be chosen because they are located in physically proximity (e.g., on the same computing node/server) or on a node/server with faster performance compared with other nodes/servers.

Tables in a particular path can also be chosen based on other considerations, such as to reduce privacy or security concerns. For example, if one path accesses a table with confidential or protected data, it may be preferable to choose a path that does not include such data. In other cases, it may be preferable to choose a path that does include a certain table. For example, if it is known that including a certain table in a path produces an efficient result compared with other options, it may be desirable that any paths to be further considered require that path. Stated another way, the disclosed technologies can incorporate a "black list," where certain nodes may not be on a selected path, and/or a "white list," where certain nodes must be on a final path.

Example 10—Graph Representation of Database Objects and Graph Traversal

Figure 4A:
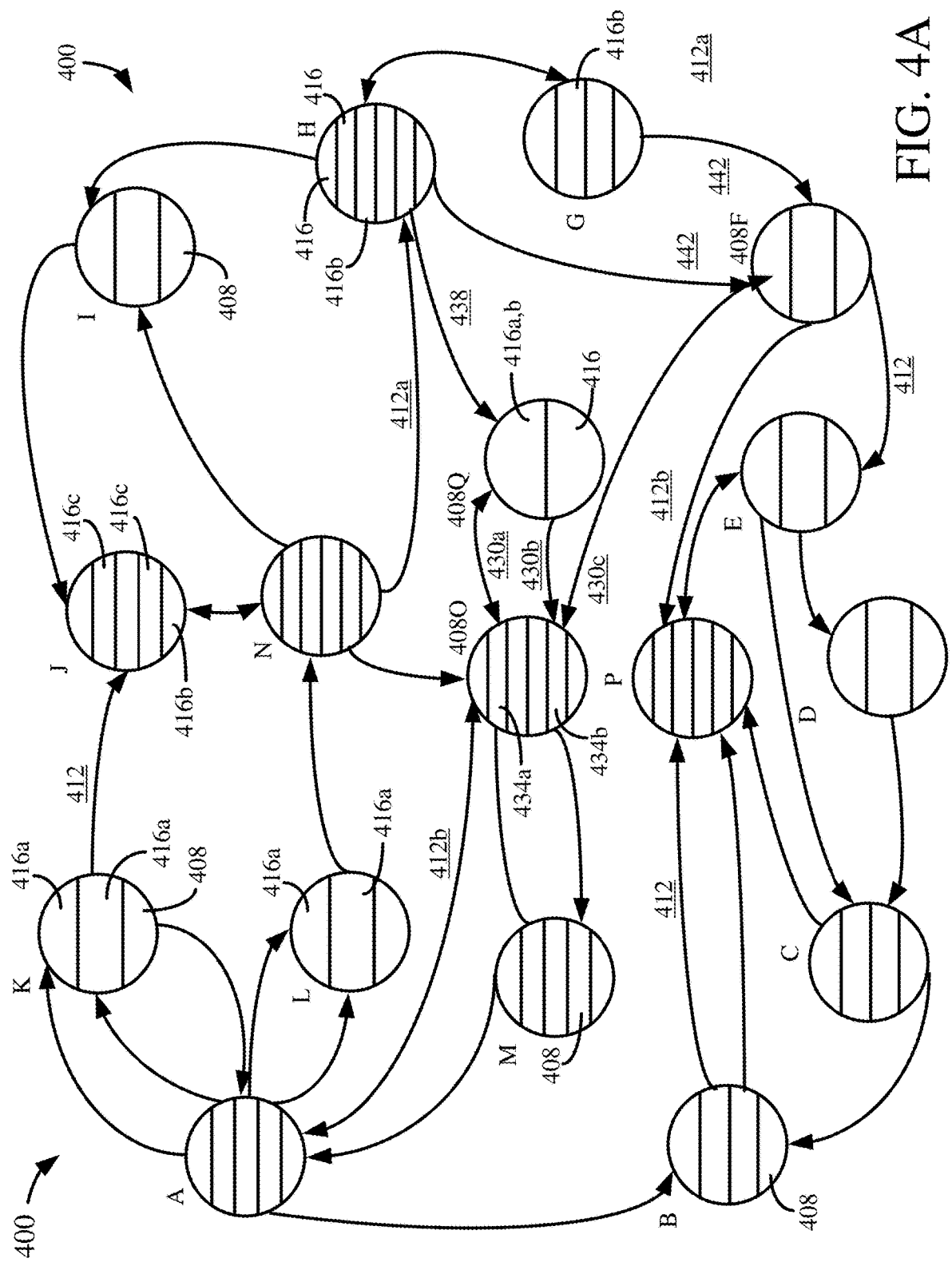
FIG. 4A illustrates a graph representing a view that includes a plurality of nodes.

FIG. 4A illustrates a graph 400 that includes a plurality of nodes 408, where each node 408 is connected to one or more other nodes through one or more edges 412. Edges 412 may be bidirectional or unidirectional. The nodes 408 can represent data sources, such as tables in a relational database. The edges 412 can represent relationships between tables. For example, an edge 412 can represent a primary-foreign key relationship, an association-alternate key relationship, or some other relationship.

Each of the nodes 408 is segmented into multiple sections 416. Each section 416 can represent a different attribute (or column or field) of a table. Some of the sections 416, such as sections 416a, can be unidirectionally connected to one or more attributes of one or more other nodes 408. Other sections, such as sections 416b, can be bidirectionally connected to one or more attributes of one or more other nodes 408 (e.g., an attribute can be both a foreign key or association and a primary key or alternate key). Additional sections 416, such as sections 416c, are not (at least currently) connected to other nodes 408.

In at least some aspects, unidirectional edges, such as edges 412, can allow a node 408 connected to the tail of an edge to retrieve information from the node connected to the head of the edge. For unidirectional edges 412, the node 408 connected to the head is typically not able to retrieve information from the node at the tail, at least not through that edge.

For example, a node 408 connected to the head may have a primary key that is an attribute 416 that serves as a foreign key for a node connected to the tail of the edge 412a (or similarly, edge 412b from node 408F to node P). The primary key serves to uniquely identify data (e.g., rows, records, or tuples of a relational database table) of the node 408 proximate the head. However, in at least some cases, the primary key of the source node 408 does not uniquely identify data of the target node, the node proximate the tail.

In some cases, the primary key of the source node 408 (which can be a target node that is a starting point for a path)

can uniquely identify data of a destination node (which can be a target node that is a destination or ending point for a path), such as when the primary key of the source node is also the primary key or an alternate key of the destination. Additionally, in some aspects, although the foreign key used by a node 408 may not be a primary key, it may be part of a super key (including a candidate key, which can be the primary key), or alternate key, of the node.

The primary key (or other type of key) of a node 408 may include attributes that reference attributes of multiple other nodes. For example, the primary key of a node 408 may include a first attribute from a first referenced node, such as using a foreign key or an association to an alternate key of such node, and a second attribute from a second referenced node, such as a foreign key or an association to an alternate key of such second referenced node.

Figure 4B:
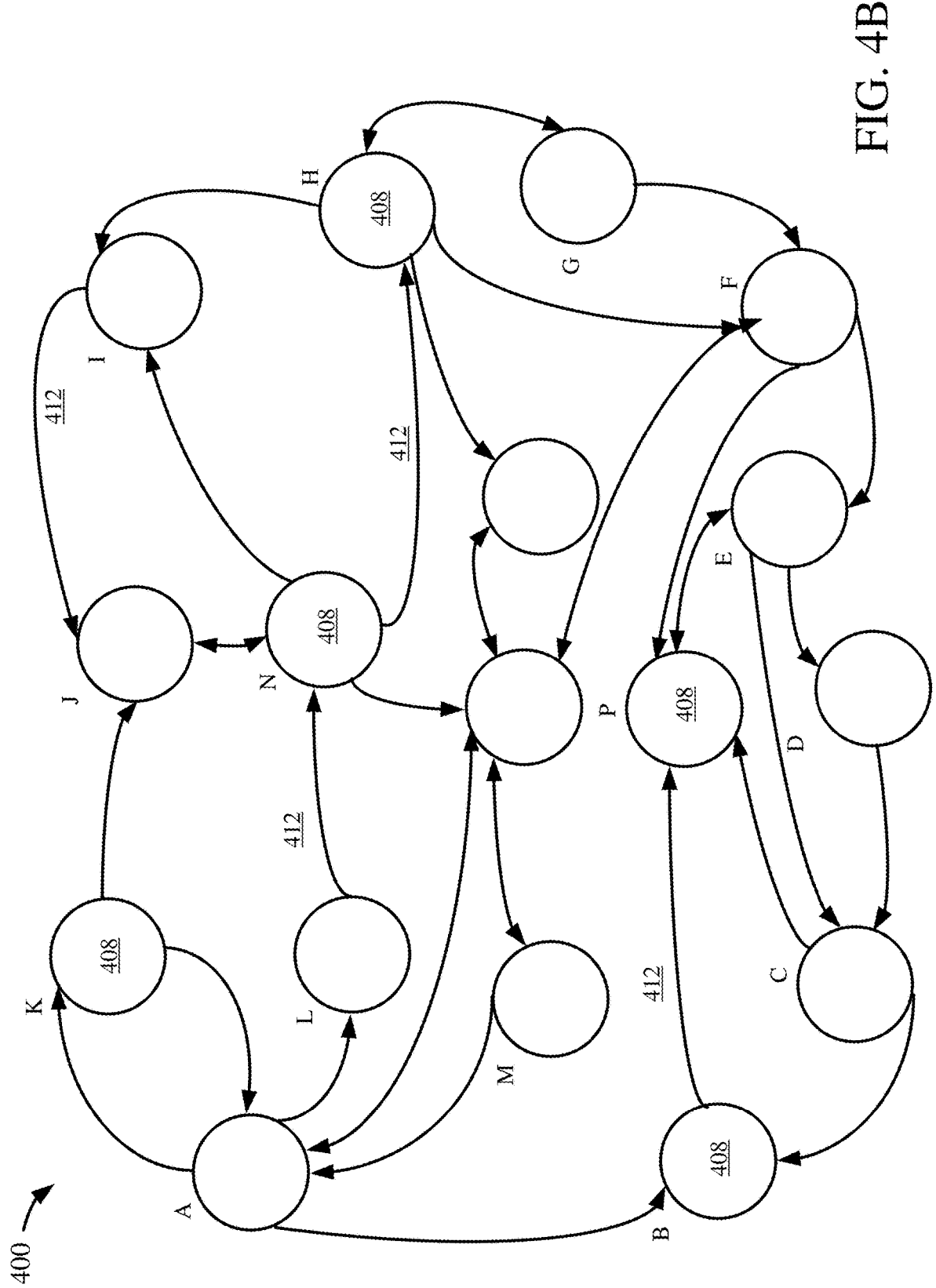
FIG. 4B illustrates seventeen nodes in a graph representing a view.

FIG. 4B illustrates seventeen nodes 408. For large database systems, such as are common for ERP applications, the number of nodes may be orders of magnitude larger. However, even for the comparatively small number of nodes 408 in FIG. 4, it can be seen that multiple pathways exist between any given node 408. As has been described, even for someone with knowledge of the nodes 408 and their relationships, it can be difficult to determine a route, all routes, or a best route between two nodes, at least if the nodes are not directly connected.

Disclosed technologies can assist in identifying one or more pathways for obtaining data from at least a first node 408 and at least a second node. Pathways can be identified by representing nodes in a data structure, such as a graph data structure that includes the nodes 408 and connecting edges 412. In some cases, the edges 412 can have one or more weights (e.g., a weight value, a vector of weight values, or a composite or abstract data type that includes one or more values). Weights can represent costs, such as network, memory, or CPU costs that would be incurred, a number of tuples processed, query complexity, or other measures of edge (and therefore path) desirability. In other cases, pathways can be determined without the use of weights.

In particular aspects, a graph traversal method is used to determine one or more paths between two or more specified nodes 408. In some cases, the traversal can determine all paths, while in other cases the traversal method can determine a subset of paths, such as a shortest path (where shortest can refer to a smallest number of nodes traversed or smallest with respect to one or more weights, or a cost function that includes multiple weights). In a particular example, a depth-first search is used to determine paths between two given nodes. In a more particular example, the depth-first search considers a single edge between pairs of nodes in a prospective path, even if multiple edges exist when considered at attribute-level granularity. Once paths are determined, attribute-level edge information can be added to the path information so that such edge information is not lost.

To illustrate how different edges 412 can be used to distinguish paths, in FIG. 4A, a node 4080 is connected to a node 408Q by edge 430a. Edge 430a connects to attribute 434a of node 4080. Attribute 434b is connected to nodes 408Q and 408F by edges 430b and 430c, respectively. If node 4080 is a terminating or target node in the path (e.g., the starting or ending node), a path through edge 430a would not be considered equivalent to a path through edge 430b, because the edges connect to different attributes of node 4080. Among other things, a request to retrieve or modify data, such as a SQL statement, would typically be constructed differently depending on whether attribute 434a or attribute 434b was being accessed (e.g., SELECT . . . WHERE ATTRIBUTE434A=VALUE versus SELECT . . . WHERE ATTRIBUTE434B=VALUE).

Similarly, if node 4080 was not a terminating node, paths through edges 430a or 430b, 430c would not be considered equivalent, at least in a final path determination, or when operations are generated to define a particular path (e.g., one or more SQL statements). First, other portions of the paths would typically be different. For example, traversing edge 430a would require a path that includes edge 438. Traversing edge 430c would require a path that includes one of edges 442. So, a path through edge 438 may have a different length (e.g., number of nodes) or cost than a path through an edge 442. Second, operations to access data, such as SQL statements, via the paths would be different.

Graph traversal algorithms typically assume that edges 412 between nodes 408 are equivalent. That is, if an edge accesses a first node, that access is equivalent to the access of an edge from any other second node that accesses the first node. Similarly, typical traversal methods assume that two nodes are connected by one edge (which could be unidirectional or bidirectional). In the event these conditions hold true, such typical graph traversal methods can be used, as well as other methods, such as Dijkstra's algorithm or the use of spanning trees (including minimum spanning trees) can be used for path calculations. However, in at least some cases, a traversal method is used that finds more than just the shortest available path, such as all paths, or a subset of all paths that includes more than a single path, including a subset of paths that are noncyclical or which satisfy other constraints (e.g., cost constraints, constraints on which nodes may or may not be in a path). Once paths are determined, attribute-level edge information can be added to the paths.

Pseudocode for a suitable traversal method is:
Start at the first target node (e.g., a starting node for the path);
Get a list of all nodes immediately reachable from the first target node;
Call the depth-first search method recursively for each node of the list;
  If the node is the second target node, mark all nodes in the found path as searched (such as using a flag or Boolean value);
  If the node has the calculated flag set, save the current path, and return to the previous node in the path;
  Otherwise, traverse all nodes connected to the current node;
Remove all nodes that are not part of a saved path; and
Add all possible edges between the nodes.

In some cases, such as using the above pseudocode, a path finding method can determine a set of nodes that are reachable without considering how they are reachable. That is, a first connection to a node through a first edge to a first attribute is considered to be equivalent to a second connection to the node through a second edge to a second attribute. Once the set of reachable nodes has been determined, the edges between the nodes can be added. A visual depiction of the graph can be provided to a user, and the user may visualize how a given path may involve connections to different attributes of a particular table.

FIG. 4B illustrates the graph of 400 showing edges 412 between nodes 408, where it is not considered to which attribute(s) an edge connects, and multiple edges between nodes are reduced to a single edge. The above pseudocode can be used to determine paths between nodes. When the paths are to be displayed to a user, the individual edges between attributes can be added in to provide information as shown in FIG. 4A. The user can then determine which of the available paths are more suitable for their purposes, including considering which paths involve the fewest number of nodes, which paths may be more efficient, and paths that may include nodes that have information that may be of interest for a particular purpose (e.g., will be retrieved in a query that traverses the path).

In other aspects, a path determination method can distinguish between different edges to a particular node. For example, assume a node A has a first edge to a first attribute of a node B and a second edge to second attribute of node B. A path from node A to node B through the first edge can be considered different than a path from node A to node B through the second edge.

In some cases, a user can supply path constraints. For example, a user can specify nodes that must be on a path or that must not be on a path. Required nodes can be in the form of a white list prior to an initial path determination, or can be provided by a user (and added to a white list) after an initial path termination. Similarly, prohibited nodes can be provided in the form of a black list prior to initial path determination, or can be provided to a user (and added to a black list) after initial path determination. After an initial path has been determined, nodes can be indicated as required or prohibited in response to user input provided using a display of a current graph of nodes and their interconnections.

When a user selects one or more nodes to be required or prohibited, the paths between nodes can be recalculated and an updated graph, typically with fewer paths, and potentially fewer nodes, can be displayed to a user. The user can interactively designate nodes to be required or prohibited to reduce the number of paths displayed. The user can select a final path, which can result in the generation of operations, such as SQL statements, to implement the chosen path.

In typical traversal methods, nodes are not visited multiple times. However, in some aspects, a traversal method can visit a node multiple times. Visiting a node multiple times can be allowed, in some cases, when multiple edges exist to the node. Visiting a node multiple times can be allowed, in further cases, when a node is required to be on a path.

Consider a set of nodes A, B, C, M, and Z. Assume node A is connected to node B, node B is connected to node C, node C is connected to nodes M and Z, and node M is connected to node Z. If multiple visits to a node are not allowed, and node M is a required node, no path exists from node A to node Z, because the only way to node Z is through node C, and node C must be reached to visit node M. However, if multiple visits to a node are allowed, and node M is a required node, a path does exist from node A to node Z, although it involves node C being visited twice—from node B to node C and from node M to node C. In further aspects, a node can be visited multiple times so long as the visits occur through different attributes. For instance, in the above example, multiple visits to node C may be allowed if the edge from B to C connects to a first attribute of node C and the edge from M to C connects to a second attribute of node C.

As mentioned, in some cases, intermediate nodes can be specified as being required for a valid path or being excluded from a valid path. In one example, when a node is specified as being required, candidate paths are evaluated. When a candidate path is determined to connect a first target and a second target node (i.e., the endpoints of the path), it is determined whether the path includes all intermediate nodes that are required for a valid path (e.g., all nodes on a white list). If it does, the path is selected as a possible path and saved. If not, the path is discarded. However, sufficient path information can be saved (e.g., a flag is set) such that the same path is not reevaluated for a particular path determination instance.

In another example, when a particular node is specified as being prohibited for a valid path, calculation of a particular path stops as soon as a node is encountered that is on the list of prohibited nodes, or black list. That is, the path finding method does not iterate over nodes on the black list. In this way, no paths indicated as valid will include a prohibited node. In other aspects, black listed nodes are just remove from the set of available nodes.

Example 11—Example Graph Representations

Figure 4C:
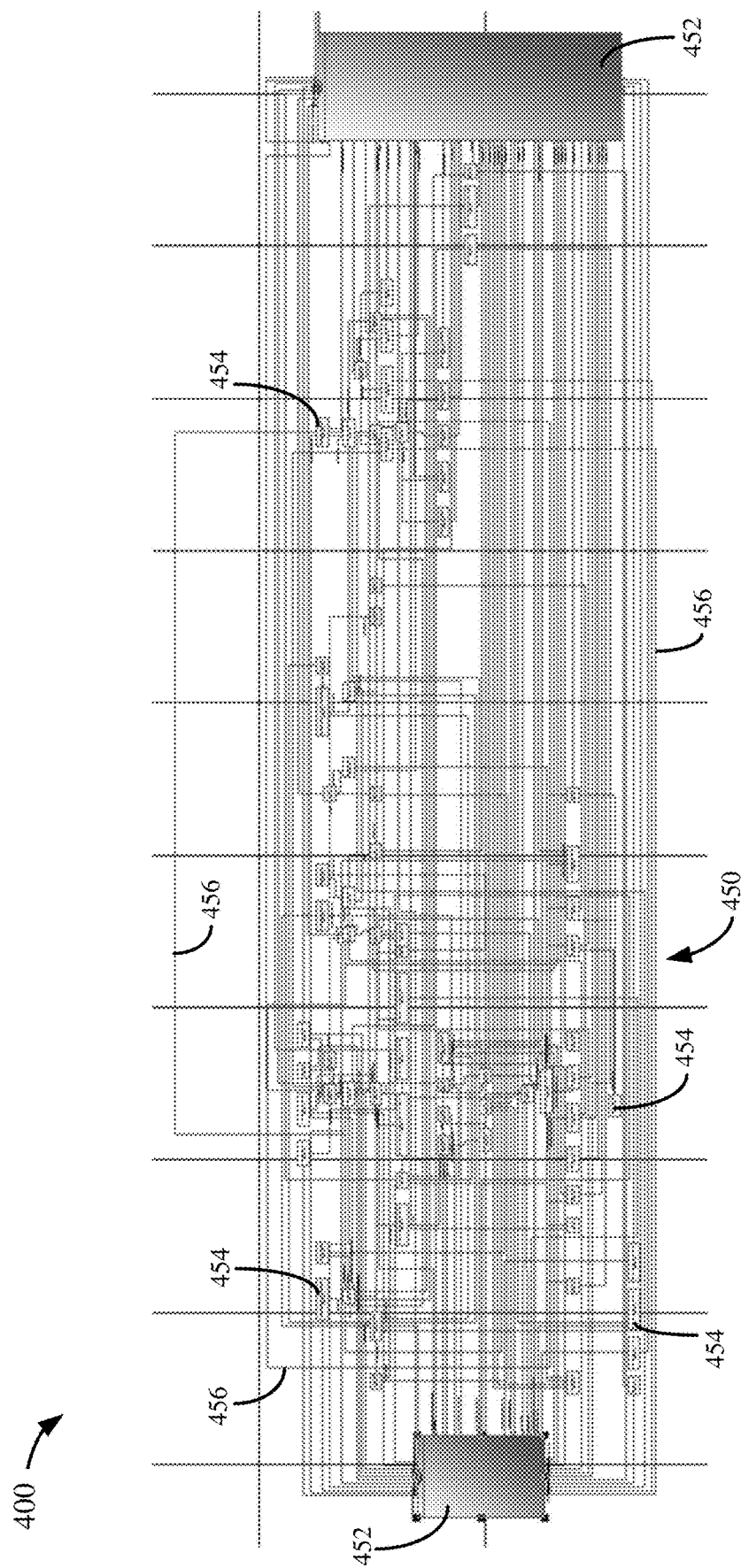
FIG. 4C illustrates a graph representation of a view with target tables and connecting tables.
Figure 4D:
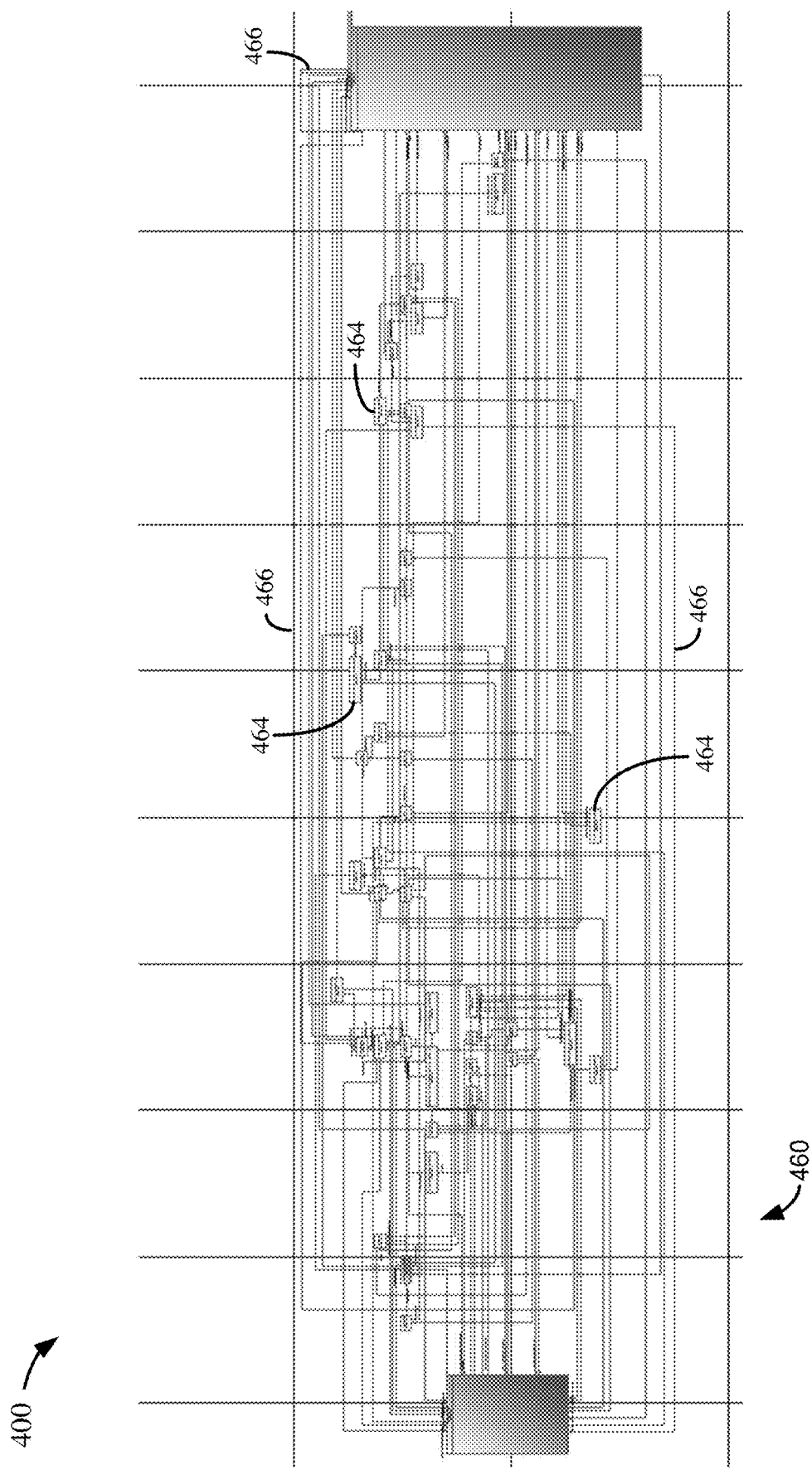
FIG. 4D illustrates a graph representation of a view with additional target tables and connecting tables.
Figure 4E:
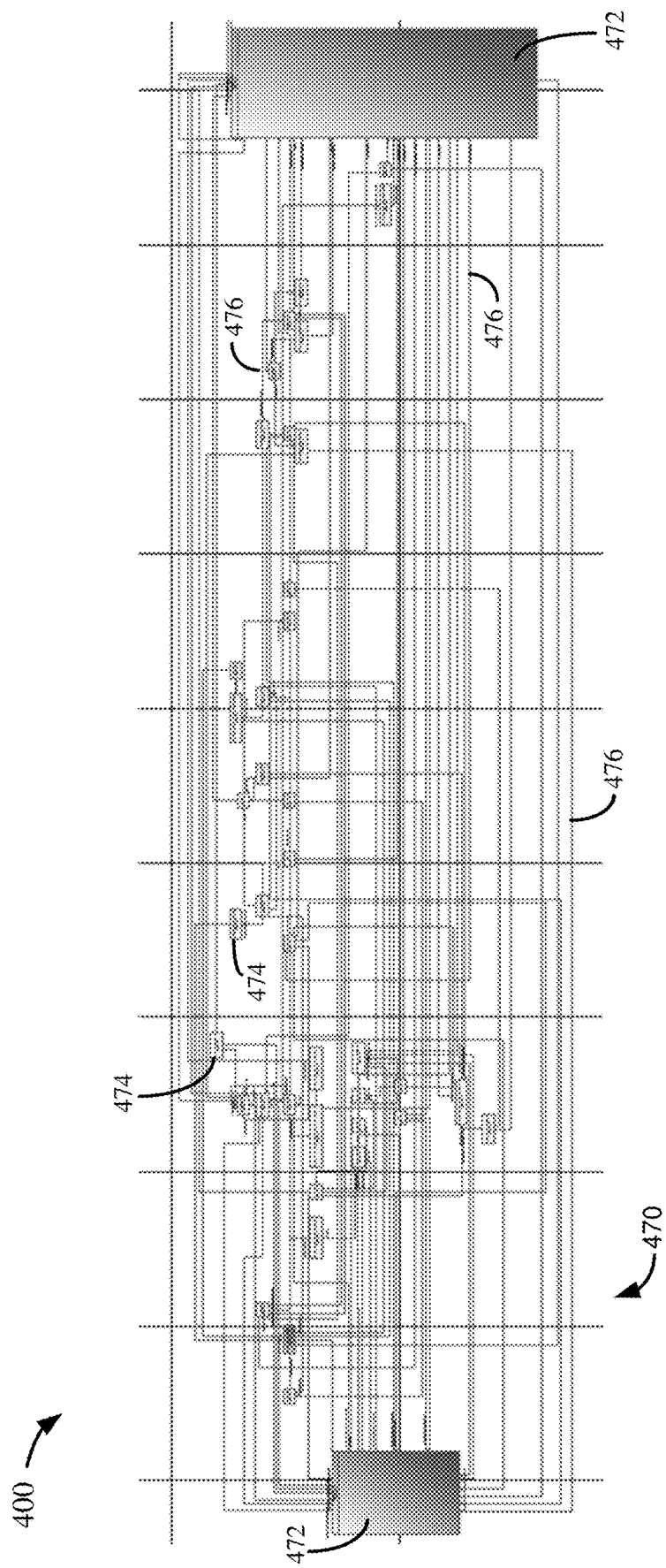
FIG. 4E illustrates a graph representation of a view with additional target tables, restricted tables, and connecting tables.

FIGS. 4C-E present example graph representations which may be mined for automatic view generation or recommendation as described herein. These examples may also be provided as visualizations in a user interface, which can allow a user to visualize paths between nodes, obtain path information (for example, nodes visited, node attributes accessed, and example operations for the path, such as SQL statements to implement the path), and better understand the automatically generated or recommended views.

FIG. 4C illustrates a graph 450 of target tables 452 (e.g., tables having one or more attributes from which data is to be retrieved) and connecting tables 454. Connections 456 link pairs of target tables 452, connecting table 454, or combinations thereof. The graph 450 can include 80 tables from which connections 456 and pathways can be formed.

Each connection 456 typically indicates a unique edge in a path between the target tables 452 (e.g., between particular sets of one or more attributes of the tables connected by the edge). In some aspects, as a connection 456 is mined, the corresponding path or paths associated with the connection is added to a set or list of mined paths (e.g. stored in a variable).

FIG. 4D illustrates a graph 460 that can be similar to the graph 450 of FIG. 4C. However, in FIG. 4D, a single table has been added to a list or request of required tables. It can be seen that the number of connections 466, and consequently pathways, has been greatly reduced compared with FIG. 4C. For example, while the graph 450 can have 80 tables, the graph 460 can have 44 tables 464—a reduction of almost half merely by requesting a single table as required.

Similarly, FIG. 4E illustrates a graph 470, which can be similar to the graph 450 of FIG. 4C. In the graph 470, a single table was added to a list of prohibited tables (e.g. exclusionary criteria when combining requested tables). Again, the number of connections 476 and intermediate tables 474, and consequently pathways, between target tables 472 has been greatly reduced compared with FIG. 4C. For example, while the graph 450 can have 80 tables, the graph 470 can have 42 tables—a reduction of almost half merely by marking a single table as prohibited.

Example 12—Join Builder Module Environments

Figure 5A:
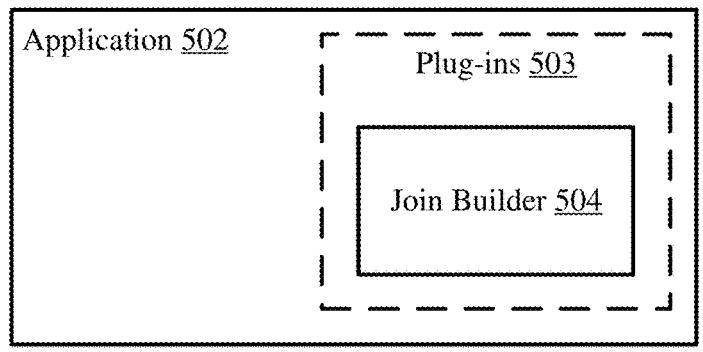
FIG. 5A is a schematic diagram depicting an application environment for a join builder module.

FIG. 5A is a schematic diagram depicting an application environment for a join builder module 504, which may provide join development or view mining functionality as described herein. An application 502, such as a software application running in a computing environment, may have one or more plug-ins 503 (or add-ins or other software extensions to programs) that add functionality to, or otherwise enhance, the application. The join builder module 504 may be integrated with the application 502; for example, the join builder module may be integrated as a plug-in. The join builder 504 may add functionality to the application 502 for mining views for data object relations with which to generate join statements, which may be displayed in a user interface or otherwise provided to a user. For example, the application 502 may be a software development or database management application, and the join builder may be integrated with the development or management application to provide recommended joins or automatically generated join statements.

Figure 5B:
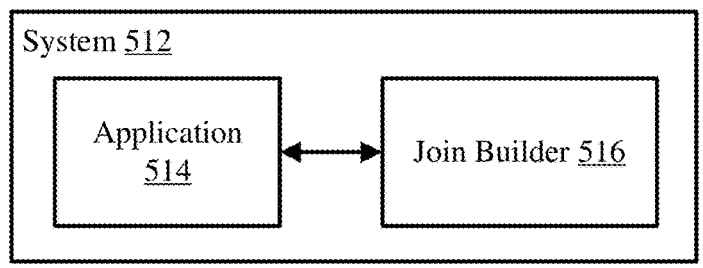
FIG. 5B is a schematic diagram depicting a system environment for a join builder module.

FIG. 5B is a schematic diagram depicting a system environment for a join builder module 516, which may provide join development or view mining functionality as described herein. The join builder module 516 may be integrated with a computer system 512. The computer system 512 may include an operating system, or otherwise be a software platform, and the join builder module 516 may be an application or service running in the operating system or platform, or the join builder module may be integrated within the operating system or platform as a service or functionality provided through the operating system or platform. The system 512 may be a server or other networked computer or file system. Additionally or alternatively, the join builder module 516 may communicate with and provide join development or view mining functionality, as described herein, to one or more applications 514, such as software development or database management application, in the system 512.

Figure 5C:
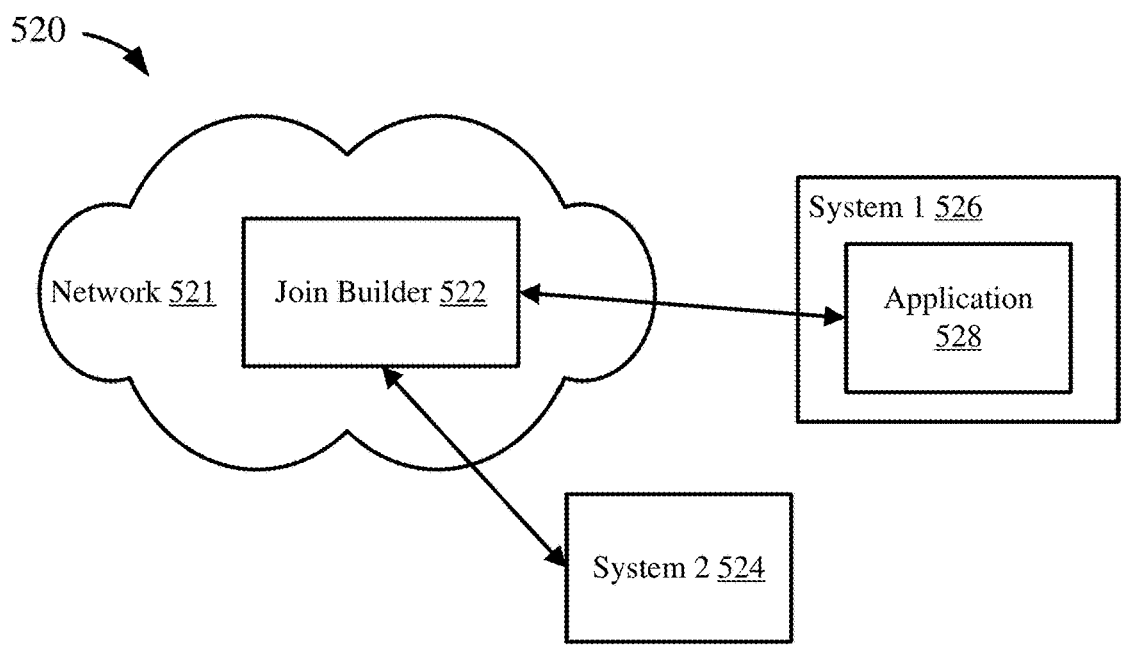
FIG. 5C is a schematic diagram depicting a network environment for a join builder module.
Figure 6A:
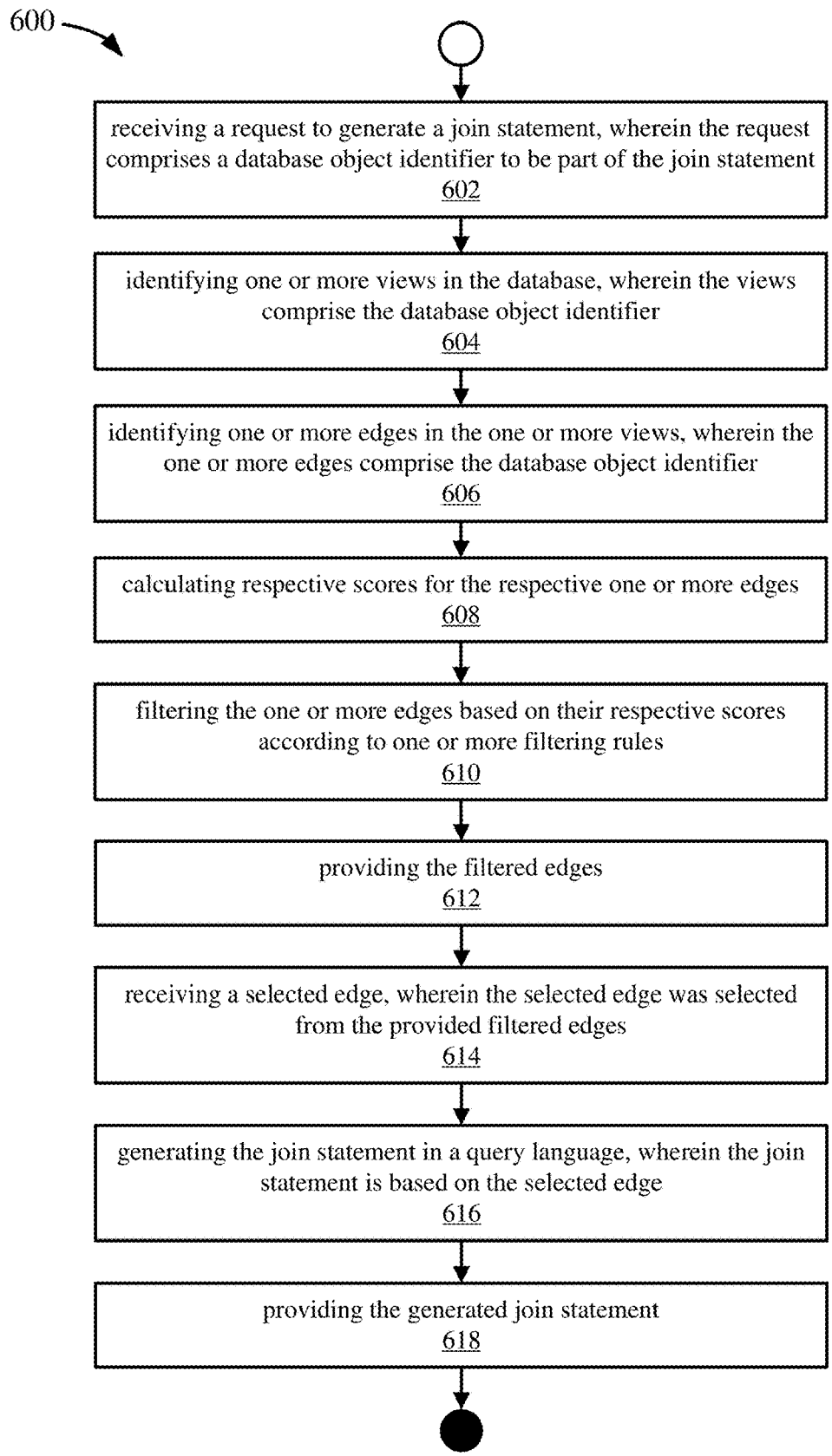
FIG. 6A is a flowchart illustrating a process for automatic join statement generation.
Figure 6B:
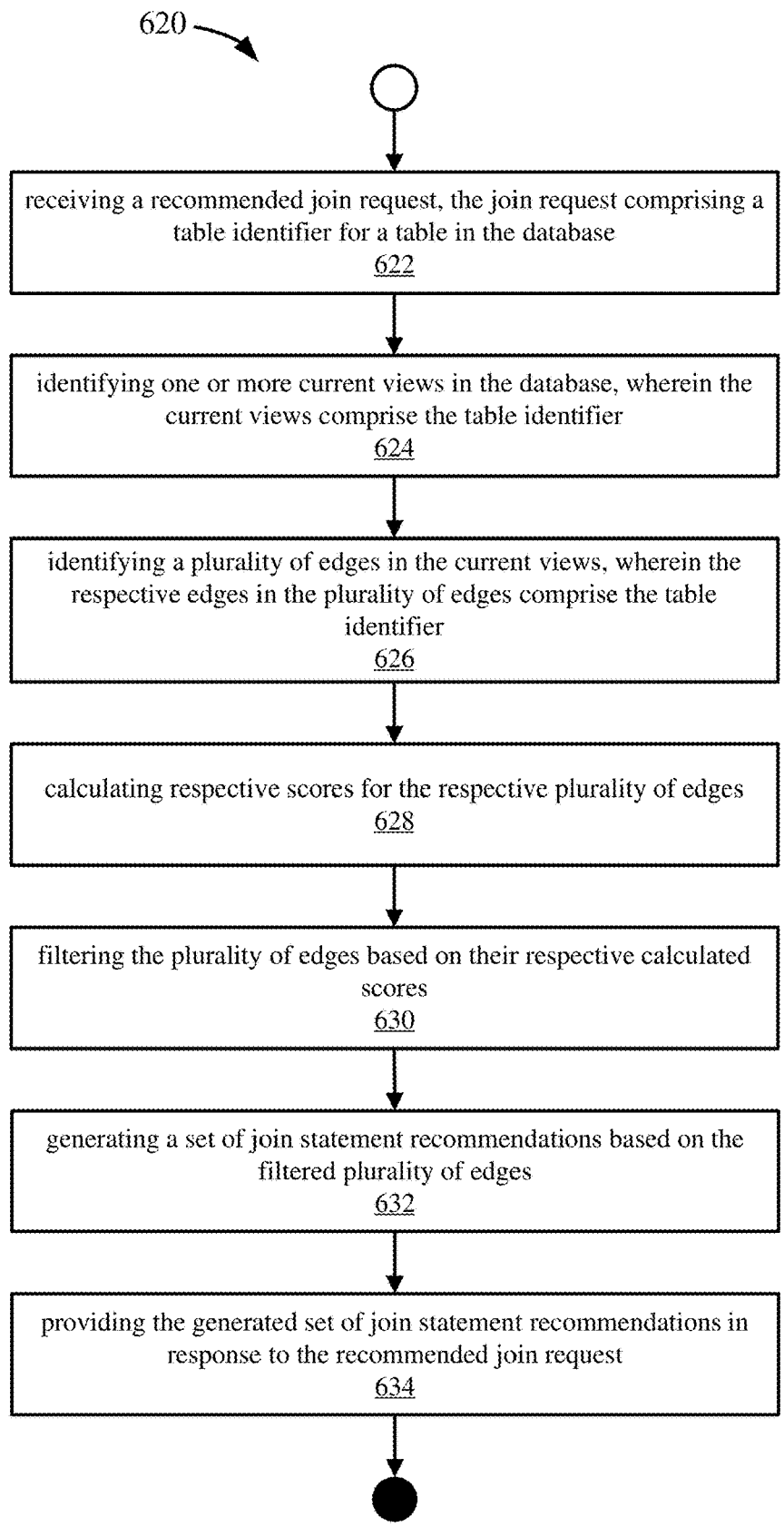
FIG. 6B is a flowchart illustrating a process for generating join statement recommendations to join one or more objects in a database.
Figure 6C:
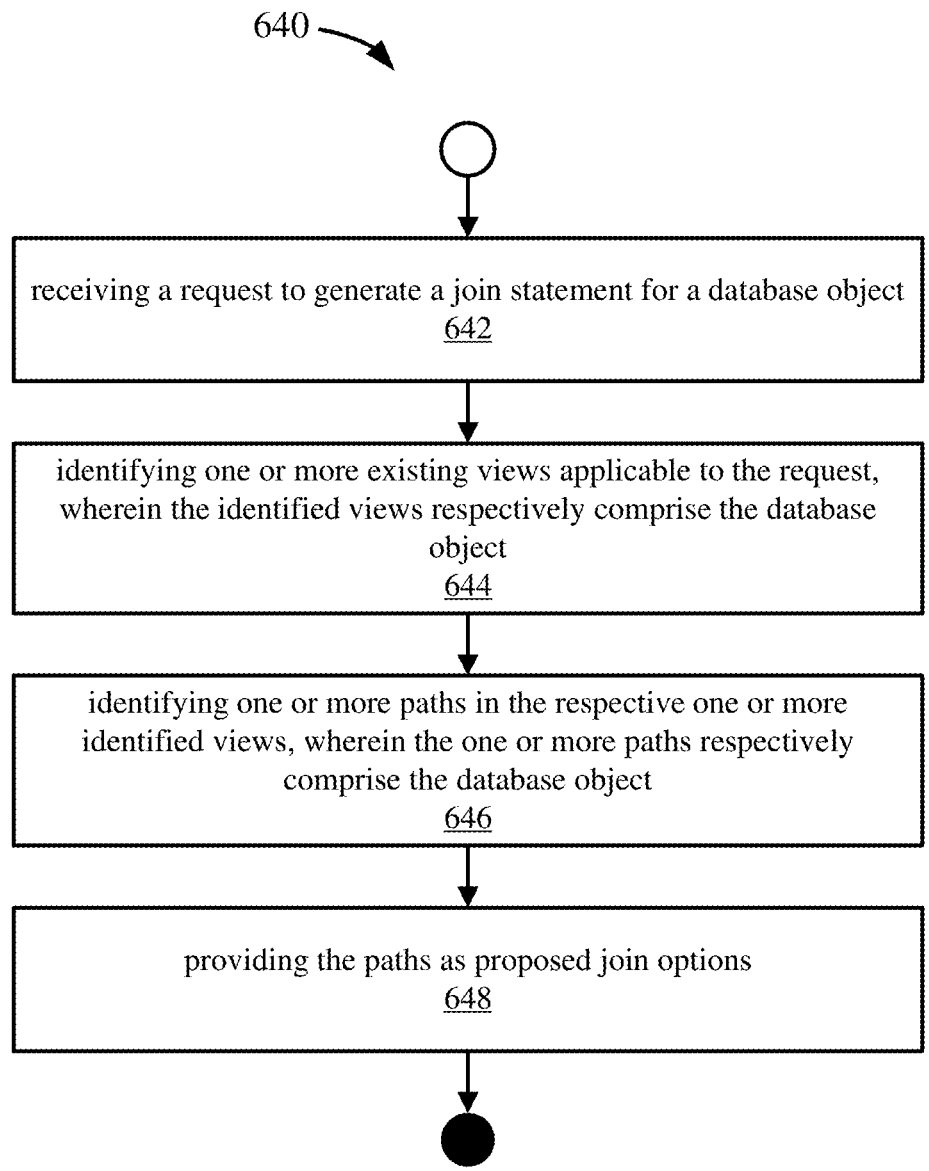
FIG. 6C is a flowchart illustrating a process for providing one or more proposed join options.

FIG. 5C is a schematic diagram depicting a network environment 520 for a join builder module 522, which may provide join development or view mining functionality as described herein. The join builder module 522 may be available on a network 521, or integrated with a system (such as from FIG. 5B) on a network. Such a network 521 may be a cloud network or a local network. The join builder module 522 may be available as a service to other systems on the network 521 or that have access to the network (e.g., may be on-demand software or SaaS). For example, system 2 524 may be part of, or have access to, the network 521, and so can utilize join development or view mining functionality from the join builder module 522. Additionally, system 1 526, which may be part of or have access to the network 521, may have one or more applications, such as application 528, that may utilize join development or view mining functionality from the join builder module 522.

In these ways, the join builder module 504, 516, 522 may be integrated into an application, a system, or a network, to provide join development or view mining functionality as described herein.

Example 13—Additional Join Generation with View Mining Processes

A system for view mining which performs a process 600 for automatic join statement generation is provided herein. A request to generate a join statement may be received at 602. The request may include a database object identifier to be part of the join statement. One or more views in the database may be identified at 604. The views may include the database object identifier. One or more edges in the one or more views may be identified at 606. The one or more edges may include the database object identifier. Respective scores for the respective one or more edges may be calculated at 608. The one or more edges may be filtered at 610 based on their respective scores according to one or more filtering rules. The filtered edges may be provided at 612. A selected edge may be received at 614. The selected edge may be selected from the provided filtered edges. The join statement may be generated at 616 in a query language. The join statement may be based on the selected edge. The generated join statement may be provided at 618.

A method 620 for generating join statement recommendations to join one or more objects in a database is provided herein. A recommended join request may be received at 622. The join request may include a table identifier for a table in the database. One or more current views in the database may be identified at 624. The current views may include the table identifier. A plurality of edges in the current views may be identified at 626. The respective edges in the plurality of edges may include the table identifier. Respective scores for the respective plurality of edges may be calculated at 628. The plurality of edges may be filtered at 630 based on their respective calculated scores. A set of join statement recommendations may be generated at 632 based on the filtered plurality of edges. The generated set of join statement recommendations may be provided at 634 in response to the recommended join request.

A method 640 for providing one or more proposed join options is provided herein. A request to generate a join statement for a database object may be received at 642. One or more existing views applicable to the request may be identified at 644. The identified views may respectively include the database object. One or more paths in the respective one or more identified views may be identified at 646. The one or more paths may respectively include the database object. The paths may be provided at 648 as proposed join options.

Example 14—Computing Systems

Figure 7:
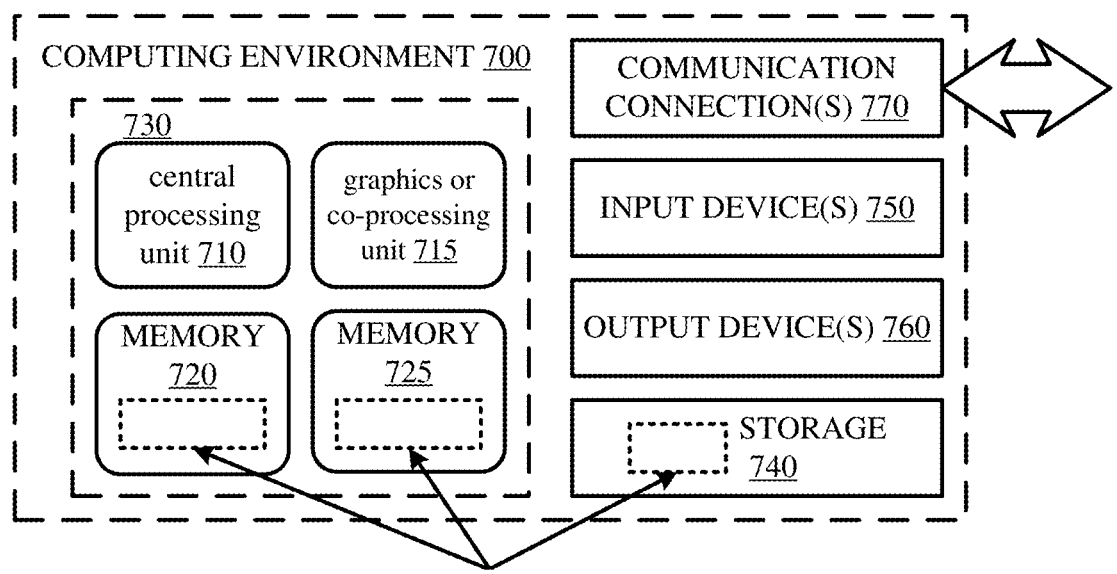
FIG. 7 is a diagram of an example computing system in which described embodiments can be implemented.

FIG. 7 depicts a generalized example of a suitable computing system 700 in which the described innovations may be implemented. The computing system 700 is not intended to suggest any limitation as to scope of use or functionality of the present disclosure, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing components of the processes of FIGS. 2A-C, 3A-B, and 6A-C, the graphs and interfaces of FIGS. 3A-C and 4A-E, or the systems of FIGS. 1A-B, and 5A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715. The memory 720, 725, may also store settings or settings characteristics, databases, data sets, interfaces, or graphs shown in FIGS. 1A-B, 3A-C, and 4A-E, systems in FIGS. 1A-B and 5A-C, or the steps of the processes shown in FIGS. 2A-C, 3A-B, and 6A-C.

A computing system 700 may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 15—Cloud Computing Environment

Figure 8:
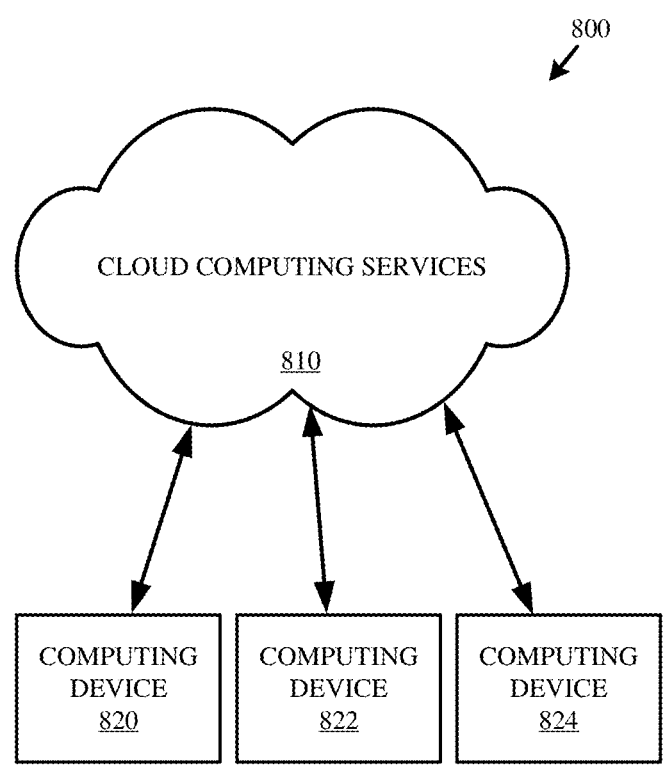
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

Example 16—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A system comprising:
   one or more memories;
   one or more processing units coupled to the one or more memories; and
   one or more computer readable storage media storing instructions that, when loaded into the one or more memories, cause the one or more processing units to perform operations comprising:
   receiving a request to generate a join statement, wherein the request comprises a database object identifier to be part of the join statement;
   identifying one or more views in a database, wherein the views comprise the database object identifier;
   identifying one or more edges in the one or more views, Wherein the one or more edges comprise the database object identifier;
   calculating respective scores for the respective one or more edges;
   filtering the one or more edges based on respective scores of the one or more edges according to one or more filtering rules to provide one or more filtered edges;
   providing the one or more filtered edges as a portion of one or more proposed join options;
   receiving a selected edge, wherein the selected edge was selected from the one or more filtered edges;
   generating the join statement based on the selected edge to provide a generated join statement; and
   providing the generated join statement in response to the join statement request.

2. The system of claim 1, wherein the one or more filtered edges are provided via a user interface.

3. The system of claim 1, wherein providing the generated join statement comprises inserting the generated join statement into program code.

4. The system of claim 1, wherein the respective scores respectively comprise a frequency of use in the views of the respective one or more edges in the respective one or more views.

5. The system of claim 4, wherein the filtering rules selects edges having a comparatively higher frequency of use score or satisfying a threshold frequency of use score.

6. The system of claim 1, wherein identifying one or more edges in the one or more views comprises accessing graph representations of the one or more views and searching the graph representations for the database object identifier.

7. The system of claim 1, wherein the one or more views comprise a plurality of views, the one or more edges comprise a plurality of edges, and the one or more filtered edges comprise a plurality of edges.

8. One or more non-transitory computer-readable storage media comprising:
   computer-executable instructions that, when executed by a computing system comprising a memory and a hardware processor, cause the computing system to receive a request to generate a join statement, the join statement request comprising a table identifier for a table in a database;
   computer-executable instructions that, when executed by the computing system, cause the computing system to identify one or more current views in the database, wherein the one or more current views comprise the table identifier;
   computer-executable instructions that, when executed by the computing system, cause the computing system to identify a plurality of edges in the one or more current views, wherein respective edges in the plurality of edges comprise the table identifier;
   computer-executable instructions that, when executed by the computing system, cause the computing system to calculate respective scores for the respective edges of the plurality of edges;
   computer-executable instructions that, when executed by the computing system, cause the computing system to filter the plurality of edges based at least in part on respective scores of the plurality of edges to provide a filtered plurality of edges;

computer-executable instructions that, when executed by the computing system, cause the computing system to generate a set of join statement recommendations based at least in part on the filtered plurality of edges to provide a generated set of one or more join statement recommendations, wherein at least a portion of join statement recommendations of the set of one or more join statement recommendations use an accumulation of view development knowledge from existing, already developed views in the database;

computer-executable instructions that, when executed by the computing system, cause the computing system to provide the generated set of one or more join statement recommendations in response to the recommended join request as a provided generated set of one or more join statement recommendations;

computer-executable instructions that, when executed by the computing system, cause the computing system to receive a selected join statement recommendation from the provided generated set of one or more join statement recommendations;

computer-executable instructions that, when executed by the computing system, cause the computing system to generate the join statement based on the selected join statement recommendation to provide a generated join statement; and computer-executable instructions that, when executed by the computing system, cause the computing system to provide the generated join statement in response to the join statement request.

9. The one or more non-transitory computer-readable storage media of claim 8, wherein the generated set of one or more join statement recommendations are provided via a user interface.

10. The one or more non-transitory computer-readable storage media of claim 8, wherein the computer-executable instructions that provide the generated join statement comprise inserting the generated join statement into program code.

11. The one or more non-transitory computer-readable storage media of claim 8, wherein the respective scores respectively comprise a frequency of use in the current views of the respective plurality of edges in the respective one or more current views.

12. The one or more non-transitory computer-readable storage media of claim 8, wherein the computer-executable instructions that filter the plurality of edges comprise comparing the respective scores of the plurality of edges to a rule and removing edges that fail the rule from the plurality of edges.

13. The one or more non-transitory computer-readable storage media of claim 8, wherein the computer-executable instructions that identify the plurality of edges in the current views comprise accessing graph representations of the respective current views and searching the graph representations for the table identifier.

14. A method comprising:

receiving a request to generate a join statement for a database object of a database;

identifying one or more existing views applicable to the request to provide a one or more identified views, wherein views of the one or more identified views respectively comprise an identifier of the database object;

identifying one or more paths in the respective one or more identified views to provide one or more identified paths, wherein the one or more identified paths respectively comprise the database object and use an accumulation of view development knowledge from the one or more existing views, where the one or more existing views were already developed in the database;

calculating one or more scores respectively for the one or more identified paths;

filtering the one or more identified paths based at least in part on respective calculated scores of the one or more identified paths;

providing at least one of the one or more identified paths as one or more proposed join options;

receiving a selected path from the one or more proposed join options;

generating the join statement based on the selected edge to provide a generated join statement; and providing the generated join statement in response to the join statement request.

15. The method of claim 14, wherein the one or more proposed join options are provided via a user interface.

16. The method of claim 14, wherein providing the generated join statement comprises inserting the generated join statement into program code.

17. The method of claim 14, wherein the one or more scores respectively comprise a frequency of use in the existing views of the respective one or more paths in the respective one or more identified views.

18. The method of claim 14, wherein filtering the one or more paths comprises comparing the scores of the one or more paths to a rule and removing paths that fail the rule from the one or more paths.

19. The method of claim 14, wherein identifying one or more paths in the respective one or more identified views comprises accessing graph representations of the one or more identified views and searching the graph representations for the database object.

* * * * *